(12) United States Patent
Manningham et al.

(10) Patent No.: US 11,829,348 B2
(45) Date of Patent: *Nov. 28, 2023

(54) SYSTEMS AND METHODS FOR A REPUTATION-BASED CONSENSUS PROTOCOL

(71) Applicant: Comcast Cable Communications, LLC, Philadelphia, PA (US)

(72) Inventors: Jason Manningham, Brooklyn, NY (US); John Maheswaran, New York, NY (US); Curtis Younker, Jersey City, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,739

(22) Filed: Jun. 29, 2022

(65) Prior Publication Data
US 2023/0093309 A1 Mar. 23, 2023

Related U.S. Application Data

(63) Continuation of application No. 16/376,541, filed on Apr. 5, 2019, now Pat. No. 11,379,462.

(51) Int. Cl.
| | |
|---|---|
| *G06F 16/00* | (2019.01) |
| *G06F 16/23* | (2019.01) |
| *G06F 16/27* | (2019.01) |
| *G06Q 30/04* | (2012.01) |
| *G06Q 30/0601* | (2023.01) |
| *G06F 16/2457* | (2019.01) |

(52) U.S. Cl.
CPC .......... *G06F 16/2365* (2019.01); *G06F 16/27* (2019.01); *G06F 16/24578* (2019.01); *G06Q 30/04* (2013.01); *G06Q 30/0609* (2013.01)

(58) Field of Classification Search
CPC .......... G06F 16/2365; G06F 16/24578; G06F 16/27; G06Q 30/04; G06Q 30/0609
USPC .................................. 707/600–899
See application file for complete search history.

(56) References Cited

U.S. PATENT DOCUMENTS

| | | | |
|---|---|---|---|
| 10,027,717 B2 | 7/2018 | Ben-Shalom et al. | |
| 10,311,230 B2 | 6/2019 | Jagadeesan et al. | |
| 10,608,829 B1 | 3/2020 | Yoshihama et al. | |
| 11,044,258 B2 * | 6/2021 | Zakharov | G06F 21/78 |
| 2003/0182421 A1 | 9/2003 | Faybishenko et al. | |
| 2018/0121909 A1 | 5/2018 | Christidis et al. | |
| 2018/0123882 A1 | 5/2018 | Anderson et al. | |
| 2018/0288033 A1 | 10/2018 | Kamal | |
| 2019/0036957 A1 | 1/2019 | Smith et al. | |

(Continued)

OTHER PUBLICATIONS

US Patent Application filed on Apr. 5, 2019, entitled "Systems and Methods for a Reputation-Based Consensus Protocol", U.S. Appl. No. 16/376,541.

*Primary Examiner* — Michelle N Owyang
(74) *Attorney, Agent, or Firm* — BakerHostetler

(57) ABSTRACT

Systems and methods are described for a reputation-based consensus protocol. A reputation score of a first node of a plurality of nodes may be determined. A distributed ledger record associated with a second node of the plurality of nodes may be received. The distributed ledger record may be stored to a distributed ledger based on the first node validating the distributed ledger record and based on the reputation score.

20 Claims, 15 Drawing Sheets

(56) References Cited

U.S. PATENT DOCUMENTS

2019/0333031 A1  10/2019 Kravitz
2020/0027089 A1* 1/2020 Kuchar .............. G06Q 20/4016
2020/0202001 A1* 6/2020 Whitney ............... H04L 9/3239
2020/0247151 A1  8/2020 Yada et al.
2020/0267151 A1* 8/2020 Wells ........................ H04L 9/50

* cited by examiner

Endpoint Signal Package

Transformed Signal
Precision: 1.00
Type: User ID
Value: ABF38A9F
702

Transformed Signal
Precision: 0.80
Type: ADID
Value: FD93698A
704

Transformed Signal
Precision: 0.20
Type: IP Address
Value: 839285BB
706

700

---

Person
ID: ABCDEFGH

Transformed Signal
Precision: 1.00
Type: User ID
Value: ABF38A9F
712

Transformed Signal
Precision: 0.80
Type: IDFA
Value: C1D02830
714

Transformed Signal
Precision: 0.20
Type: IP Address
Value: 56A740BC
716

710

---

Person
ID: IJKLMNOP

Transformed Signal
Precision: 0.80
Type: ADID
Value: FD93698A
722

Transformed Signal
Precision: 0.40
Type: Tel. Number
Value: 12309847
724

720

---

Ordered Signal List

| Signal | Precision |
|---|---|
| A8F8A9F | 1.00 |
| C1DD2830 | 0.80 |
| FD93698A | 0.80 |
| 12309847 | 0.40 |
| 56A740BC | 0.20 |
| 839285BB | 0.20 |

Person
ID: ABCDEFGH

Transformed Signal
Type: User ID
Value: ABF38A9F
802

Transformed Signal
Type: IDFA
Value: C1D02830
804

Transformed Signal
Type: IP Address
Value: 56A740BC
806

Transformed Signal
Type: ADID
Value: FD93698A
808

Transformed Signal
Type: IP Address
Value: 839285BB
810

800

Person
ID: IJKLMNOP

Transformed Signal
Type: ADID
Value: FD93698A
822

Transformed Signal
Type: Tel. Number
Value: 12309847
824

Transformed Signal
Type: User ID
Value: ABF38A9F
826

Transformed Signal
Type: IP Address
Value: 839285BB
828

820

Ordered Signal List

| Signal | Precision |
|---|---|
| A8F8A9F | 1.00 |
| C1DD2830 | 0.80 |
| FD93698A | 0.80 |
| 12309847 | 0.40 |
| 56A740BC | 0.20 |
| 839285BB | 0.20 |

830

Signal Hash Map

| A8F8A9F | ABCDEFGH, IJKLMNOP |
|---|---|
| C1DD2830 | ABCDEFGH |
| FD93698A | ABCDEFGH, IJKLMNOP |
| 12309847 | IJKLMNOP |
| 56A740BC | ABCDEFGH |
| 839285BB | ABCDEFGH, IJKLMNOP |

840

SYSTEMS AND METHODS FOR A REPUTATION-BASED CONSENSUS PROTOCOL

CROSS-REFERENCE TO RELATED APPLICATION

This application is a continuation of U.S. patent application Ser. No. 16/376,541, filed Apr. 5, 2019, which was issued as U.S. Pat. No. 11,379,462, issued on Jul. 5, 2022, which is hereby incorporated by reference in its entirety.

BACKGROUND

Blockchain technology is increasingly being used to record data. Data is generally added to a blockchain using distributed consensus protocols. Existing consensus protocols include proof-of-work mining or proof-of-stake mining. Proof-of-work mining involves solving computational puzzles to validate blockchain transactions and may be computer resource intensive. Proof-of-stake mining involves selecting a creator of a next block of the blockchain based on stake held by actors, such as cryptocurrency held in digital wallets of the actors. Proof-of-stake mining has limited applications, as it generally favors actors with more stake. There is a need for alternative distributed consensus protocols.

SUMMARY

Systems and methods are described for a reputation-based consensus protocol. A reputation score of a first node of a plurality of nodes may be determined based on one or more factors. The factors may comprise behavior of a user associated with the first node, technical maintenance of the first node, and/or an amount of data supplied by the first node, as examples. A distributed ledger record associated with a second node of the plurality of nodes may be received by the first node. The record may be validated by the first node. The record may be validated based on the reputation score of the first node. In addition or alternatively, a plurality of nodes, including the first node, may vote to validate the record. The record may be validated based on the reputation scores of nodes that vote to validate the record. The record may be stored to a distributed ledger based on validation of the record.

BRIEF DESCRIPTION OF THE DRAWINGS

The following drawings show generally, by way of example, but not by way of limitation, various examples discussed in the present disclosure. In the drawings:

FIG. 7 shows an example data distillation method.
FIG. 8 shows an example data distillation method.

DETAILED DESCRIPTION

Figure 1:
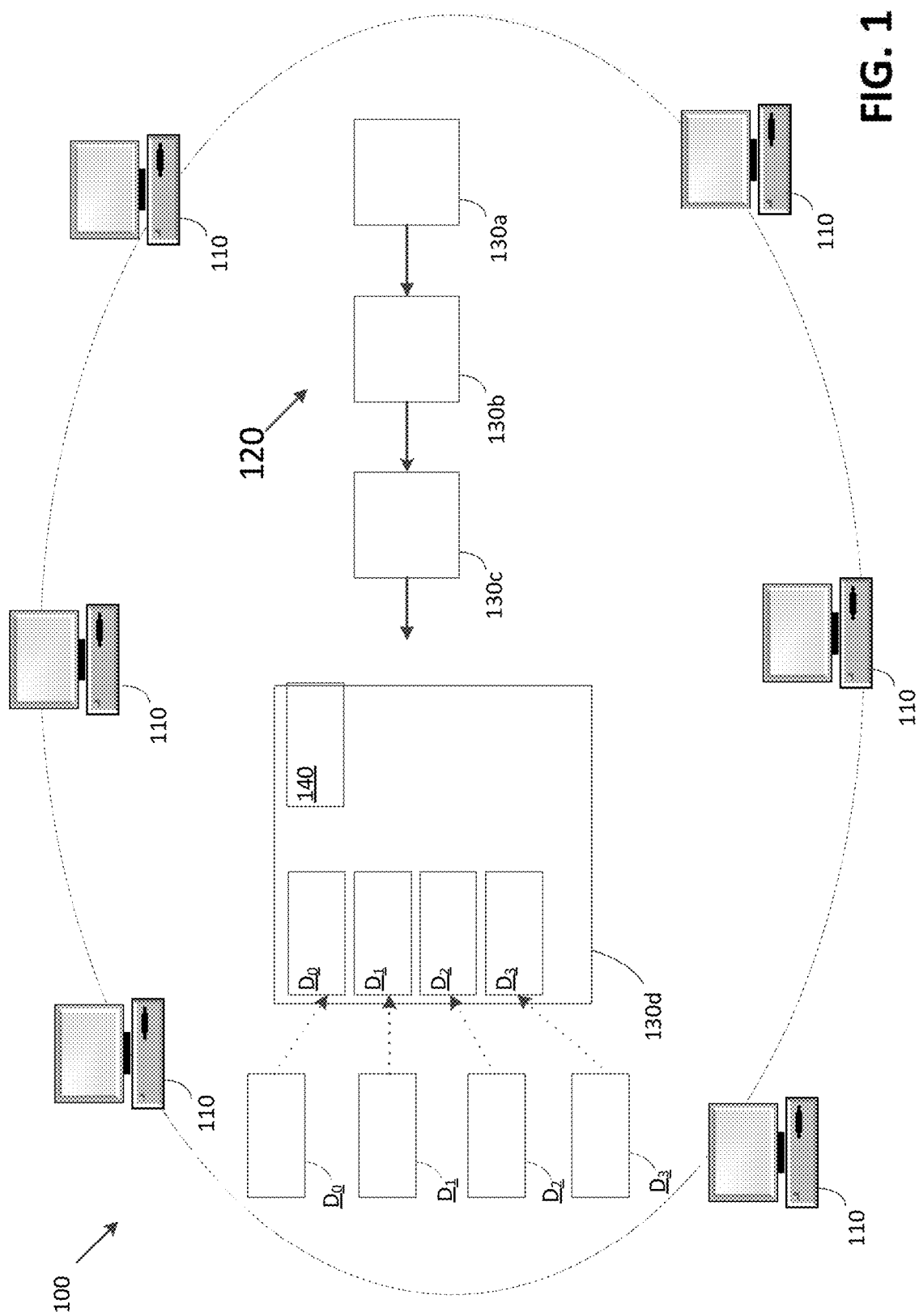
FIG. 1 shows an example distributed system architecture.

Systems and methods are described for a reputation-based consensus protocol. A blockchain may comprise a network of nodes. Each node may comprise a reputation score. The reputation score may be associated with an entity associated with a particular node. A node may be selected to add a new block to the blockchain through a proprietary "proof-of-reputation stake" algorithm. In the proprietary "proof-of-reputation stake" algorithm, a reputation score of a node may be weighted such that the higher the reputation score of the node, the better chance of being selected to mint a new block the node has. The blockchain may comprise records comprising user profiles. The blockchain may be used to determine advertisement placement opportunities. The nodes may vote to determine a consensus of the blockchain. The voting power of a node may be determined by a respective reputation score of the node.

Participants in the media industry may generate aggregated insights from first party data and scale addressable advertising by recognizing the same end users across multiple endpoints, applications, and/or data sets. Participants may recognize mutual customers without exposing or sharing end user personal data and/or participant proprietary data.

Participants may contribute to a distributed identifier graph that deterministically identifies end users across participant footprints. The distributed identifier graph may be an industry-wide graph. The distributed identifier graph may comprise a peer-to-peer platform. The distributed identifier graph may be provably trustless. The distributed identifier graph may be compliant with government regulations for data security, such as compliant with the General Data Protection Regulation (GDPR). The distributed identifier graph may be cryptographically secure. The distributed identifier graph may comprise scalable infrastructure. The distributed identifier graph may comprise source code that is available for scrutiny (e.g., read-only open source). The participants may maintain nodes of a network. The network may comprise the distributed identifier graph.

Participants can resolve their customers against the broader distributed identifier graph by using two sources of information: existing customer relationship management data and by identifying cryptographically transformed pseudonymized signals generated by consumer devices in real time. As participants add new information to their respective nodes, the distributed identifier graph will be improved and propagated across the nodes in the network in near real time.

A distillation process may be used to identify and deduplicate end users across devices and across participant footprints. Distillation may comprise improvement of the precision with which end users may be recognized across the network. Based on customer relationship management data and identified signals generated by consumer devices, distillation may improve the distributed identifier graph in near real time. Participants may use distillation to identify customers across devices. Participants may assign customers proprietary user identifiers. Devices may be used to connect a person's identity across multiple participants' data sets.

Each time a participant adds identifying information to their node, the identifying information may be pseudonymized. The pseudonymized identifying information may be compared with the pseudonymized information of other participants' users in a local version of a public person database. All person records with overlapping metadata in the local version of the public person database may be collected. All information about all collected person records may be considered holistically.

Starting with the most precise identifiers available, new person records may be generated in the system. Precise identifiers may comprise email addresses, usernames, geographic addresses, phone numbers, and/or MAC addresses, as examples. Device and household level information may be appended to the new records. A local copy of the public person database then may be shared with all network participants. Distillation may stop based on there being no remaining identifiers precise enough to recognize individual end users.

The distributed identifier graph may be incrementally improved each time an end user, such as a customer, consumer, and/or subscriber, interacts with an endpoint device. By only distilling based on new information entering a node, computational resources may be used more efficiently, especially for active humans and/or endpoints. Efficient use of computational resources may result in lower computational usage and/or power exertion. The distributed identifier graph may be kept current by allowing old records to go stale and deactivate. The distributed identifier graph may prune itself.

Keeping the distributed identifier graph on a blockchain may allow marketers to securely ask questions of data owners in order to better target premium video advertisers. Using a blockchain may allow data owners, through bilateral agreements with other users, to opt in to monetize their data and be compensated for answering questions. The blockchain may track questions being asked and answered through the platform. A record of a question asked and answered may be logged into the blockchain. The blockchain may keep a log of both asking and answering questions, facilitating consistency of records of a questioning participant's records and an answering participant's records. At an end of a billing cycle, data owners may query the blockchain for billing purposes. For example, parties that submit queries and/or receive data may be charged. Parties that submit response to the queries and/or data may be compensated.

Using a blockchain may provide benefits regarding transparency and security. Blockchains may provide a universal source of truth. Data owner records and data user records may remain consistent, which may reduce costs associated with reconciliation between organizations. Using a blockchain may allow participants to have a secure, immutable record of which questions a particular participant asked (and to which party), which of the questions asked by the particular participant were answered (and by which party), and/or which questions were answered by the particular participant (and from which party the questions came). Using a blockchain may increase audibility and error detection. Discrepancies between parties may be resolved by verifying hashes between blocks of transactions on the blockchain. Using a blockchain may allow a participant to see which other participants have joined and use the platform.

The blockchain may use a cryptocurrency framework. The blockchain may use an Ethereum framework. The blockchain may use a Quorum framework. The blockchain may use a consensus-based mining framework. The blockchain may use an Istanbul Byzantine Fault Tolerance (BFT) framework. The blockchain may comprise a permissioned network. The permissioned network may only comprise permissioned nodes. The blockchain may use a Constellation framework. Sensitive data may remain off-chain between two participants. A hash of the sensitive data may be committed to the blockchain to support auditability.

The blockchain may use a proof of stake framework. The blockchain may use a proprietary "proof of reputation stake" framework. In the proprietary "proof of reputation stake" framework, a reputation score may be computed for each participant. A reputation score may determine a respective participant's voting power in the blockchain consensus-based mining framework. A participant may increase a respective reputation score by increasing a respective reputation. A participant's reputation may have a data component. The participant's reputation may increase as the participant contributes data (e.g., signals, etc.) to the blockchain. The participant's reputation may have a technical component. The lower the technical error rate of a node maintained by a participant is, the higher a participant's reputation may be. A participant's reputation may have a financial component. The participant may maintain a high reputation score through timely payment of platform subscription fees.

FIG. 1 shows an example distributed system. The distributed system may comprise a network 100 of nodes 110. A node 110 may comprise a computing device, a central processing unit, a graphical processing unit, a field programmable gate array, or an application specific integrated circuit. A node 110 may comprise a cable modem, set-top box, lap top, smart phone, tablet, a portable digital assistant, a smart television, wearable computing device, mobile computing device, an Internet of Things ("IoT") device, or any device with computing capabilities or network connectivity capabilities. A node 110 may comprise one or more computing devices maintained by a participant.

The network 100 of nodes 110 may comprise a decentralized database. The decentralized database may not have a central administrator or centralized storage. Each node 110 in the network 100 may store a copy of a collection of data, such as a distributed ledger. A distributed ledger may comprise recorded entries, such as transactions. The data may be replicated, shared, or synchronized across the nodes 110. The decentralized database may be continually reconciled, such as to reflect changes to the collection of data. The nodes 110 may continually or periodically download the most recent version of the collection of data. Based on a node 110 joining the network 100, the node 110 may automatically download the collection of data.

A decentralized database, such as a distributed ledger, may comprise a blockchain 120. The decentralized database, such as the distributed ledger may comprise a blockchain database and/or utilize blockchain data management techniques. A blockchain 120 may comprise one or more blocks 130 in which data is recorded. The blocks 130 in the blockchain 120 may function as a mechanism to organize the data in the blockchain 120. The blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network 100 may build the blockchain 120, such as by adding blocks 130 to the blockchain 120. The nodes 110 may perform several operations to build the blockchain 120. Based on new data $D_0$, $D_1$, $D_2$, $D_3$ being received by the network 100, the nodes 110 may validate the new data $D_0$, $D_1$, $D_2$, $D_3$. If the new data $D_0$, $D_1$, $D_2$, $D_3$ comprises transactions, the nodes 110 may validate, verify, or authenticate the identity of the parties to the transaction.

The one or more transactions may comprise end user information. The one or more transactions may comprise hashes (e.g., encrypted versions, etc.) of end user information. The one or more transactions may comprise a query. The one or more transactions may comprise a hash of a query. The one or more transactions may comprise a response to a query. The one or more transactions may comprise a hash of a response to a query. A transaction may comprise a public key of a party to the transaction and a digital signature of the party to the transaction. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature with the public key. The digital signature may allow for verification of the transaction while maintaining the anonymity of the parties to the transaction.

The nodes 110 may collate the new data $D_0$, $D_1$, $D_2$, $D_3$ into a new block 130d. The nodes 110 may record one data entry Do in a new block 130d. The nodes 110 may perform an operation to add the new block 130d to the blockchain 120. If the data in the blocks 130 is related chronologically, such as where the first block 130a in the chain records older data than the data of subsequent blocks 130b, 130c, the nodes 110 may perform a timestamp function to log the sequence in which blocks 130 are added to the blockchain 120. The nodes 110 may append a hash of the previous block 130c to the new block 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the blockchain 120.

The nodes 110 may be incentivized to perform the operation to add a new block 130d to the blockchain 120. A block 130d may be assigned a value 140, such as a coin or unit of digital currency that will be transferred to one or more nodes 110 that perform part or all of the operation. A digital currency may comprise a cryptocurrency, such as Bitcoin, Litecoin, TorCoin, Ethereum, etc. The value 140 may depend on the difficulty of performing the operation for the block 130d. Also, if the data $D_0$, $D_1$, $D_2$, $D_3$ recorded in a block 130d comprises transactions, a transaction may assign a transaction fee $TF_0$, $TF_1$, $TF_2$, $TF_3$ which may be transferred to one or more nodes 110 that perform the operation on the block 130d in which the transaction is recorded. If an incentive is provided for nodes 110 to perform the operation to add the new block 130d to the blockchain 120, performance of the operation may be referred to as mining.

The nodes 110 may individually perform an operation to build the blockchain 120. The nodes 110 may lend or combine their processing power, such as in a pool, to perform an operation to build the blockchain 120. If the nodes 110 work in tandem, incentives, such as the value 140, may be divided amongst the nodes 110. Incentives may be divided proportionally to contribution of the nodes 110 to the work.

Once the operation is performed to add a new block 130d to the blockchain 120, the nodes 110 may communicate the new block 130d to the network 100. The nodes 110 may express their acceptance of the new block 130d to the blockchain 120 by working off the block 130d to perform the operation to add a subsequent block to the blockchain 120.

If more than one version of the blockchain 120 exists, the nodes 110 may attempt to work off the longest blockchain 120. The longest blockchain 120 may be determined by an algorithm for scoring the blockchain 120. A blockchain 120 may be assigned a score based on the computational work required to generate the blockchain 120. A node 110 may communicate the longest blockchain 120 that the node 110 has observed to the network 100, such as with a gossip protocol.

The network 100 may have self-correcting mechanisms, such as to address discrepancies between nodes 110 in the network 100. If there is a fork in a blockchain 120, a node 110 working off one branch of the blockchain 120 may switch to a second branch of the blockchain 120, if the second branch becomes longer than the first branch. If a node 110 does not receive a block 130b, the node 110 may request the block 130b based on the node 110 receiving the next block 130c and determines that the node 110 did not receive the previous block 130b.

One or more nodes 110 in the network 100 may not participate in building the blockchain 120. The operations that the nodes 110 in the network 100 may perform relating to the blockchain may not be limited to building the blockchain 120. One or more nodes 110 may monitor the blockchain 120 for particular transactions. The nodes 110 may monitor the blockchain 120 for transactions that comprise an identifier associated with a party.

Figure 2:
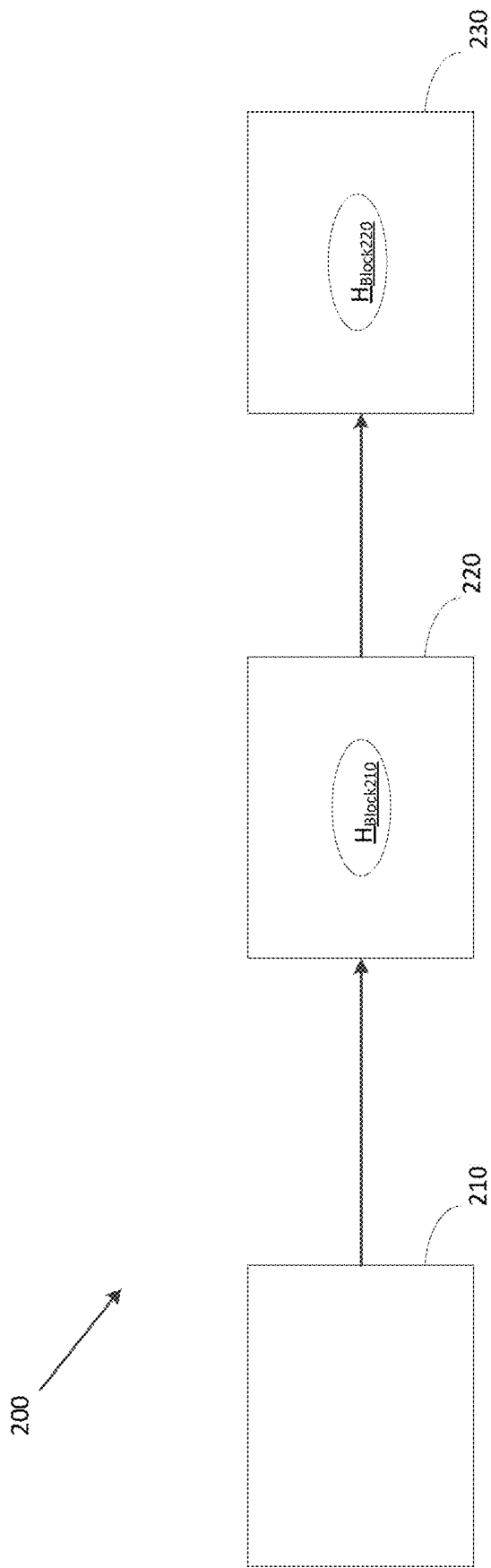
FIG. 2 shows an example blockchain architecture.

FIG. 2 shows an example distributed ledger architecture. A distributed ledger may comprise a blockchain 200 in which one or more transactions are recorded in blocks 210, 220, 230. The one or more transactions may comprise end user information. The one or more transactions may comprise hashes (e.g., encrypted versions, etc.) of end user information. The one or more transactions may comprise a query. The one or more transactions may comprise a hash of a query. The one or more transactions may comprise a response to a query. The one or more transactions may comprise a hash of a response to a query. The distributed ledger may comprise a blockchain database and/or utilize blockchain data management techniques. The blocks 210, 220, 230 may be linked in a sequence that represents the chronology of the execution, validation, or recording of the transactions. The blockchain 200 may comprise a genesis block 210 that records the earliest transaction in the blockchain 200 and comprises the first block 210 in the blockchain 200.

Each block 220, 230 following the genesis block 210 may record a transaction that was executed or validated subsequent to the transaction of the preceding block 210, 220, 230 in the blockchain 200. Each block 210, 220, 230 may record a transaction that occurred prior to the transaction of the subsequent block in the blockchain 200. The block 230 may record a transaction that occurred after the transaction recorded in the block 220. A new transaction may be recorded in a new block. The new block may be appended to the last block 230 in the blockchain 200. Although the example blockchain 200 is shown as comprising three blocks 210, 220, 230, the blockchain 200 may comprise less than three blocks or more than three blocks. The blocks 210, 220, 230 may record transactions as hashes of the transactions.

The blocks 210, 220, 230 may function as a mechanism to implement a timestamp server to generate computational proof of the chronological order of the transactions in the blockchain 200. A timestamp of a block 210, 220, 230 may comprise a hash of the transaction in the block 210, 220, 230 and the transaction of the previous block 210, 220, 230 in the blockchain 200. The timestamp may be recorded, such as by publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise scanning for a proof ($Proof_{210}$, $Proof_{220}$, $Proof_{230}$), such as a string or value, that cryptographically hashed with the hash of the transaction of a block ($H_{Transaction}$) and the hash of the transaction of the previous block yields a hash ($H_{Block}$) with a pre-determined number of leading zero bits. A proof ($Proof_{210}$, $Proof_{220}$, $Proof_{230}$) may be identified such that the hash ($H_{Block}$) has 60 leading bits that are zero.

For example, a proof-of-work for the block 220 may comprise scanning for a proof ($Proof_{220}$) that hashed with the transaction of the block 220 ($H_{Transaction220}$) and the hash of the previous block 210 ($H_{Block210}$) yields an output ($H_{Block230}$) that has a pre-determined number of leading zero bits. The proof-of-work may be solved for a hash function in which a hash of the transaction ($H_{Transaction}$) is an input of the hash function. The next block 230 in the blockchain 200 will be appended to the blockchain 200 based on a proof-of-work being performed to identify a proof ($Proof_{230}$) which hashed with the transaction of the block 230 (or hash of the transaction $H_{Transaction230}$) and the hash of the block 220 ($H_{Block220}$) yields an output ($H_{Block230}$) with a pre-determined number of leading zero bits. Once the proof ($Proof_{230}$) is identified, the block 230 may be broadcast through the network. If the block 230 is accepted, the nodes may work on creating the next block in the blockchain 200 using the hash ($H_{Block230}$) of the accepted block 230.

An iterative proof-of-work protocol may deter modification of a block in the blockchain 200 as it would require re-doing the proof-of-work for each proceeding block in the blockchain 200. Modification of a transaction in the block 210 may require performance of a new proof-of-work for block 210, yielding a new hash ($H_{Block210}$) for the block 210. Consequently, a new proof-of-work may be required for the block 220 using the new hash ($H_{Block210}$) for the block 210, yielding a new hash ($H_{Block230}$) for the block 220. Each subsequent block in the blockchain 200 may require a new proof-of-work.

Figure 3:
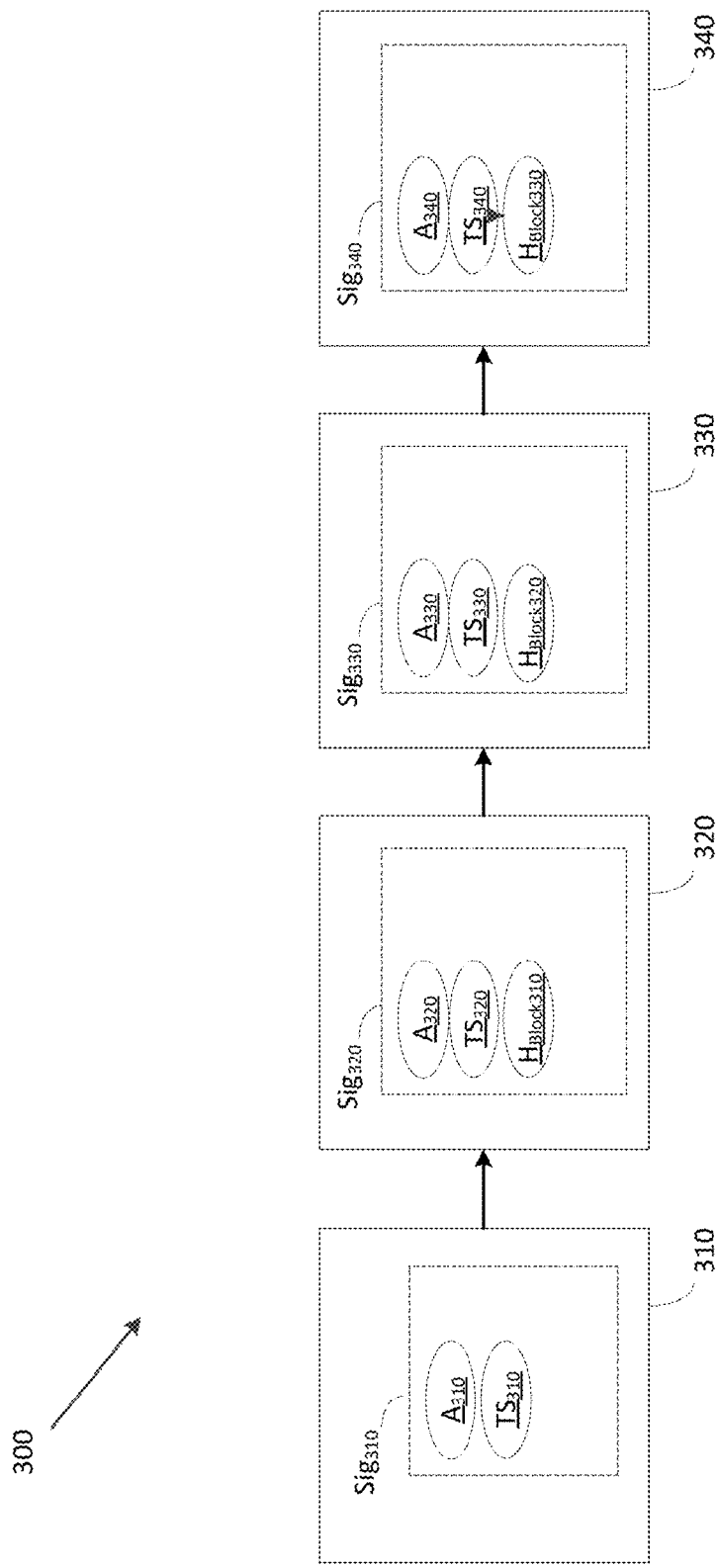
FIG. 3 shows an example distributed ledger architecture.

FIG. 3 shows an example distributed ledger architecture. The system may comprise a distributed ledger 300. The distributed ledger 300 may comprise a plurality of blocks 310, 320, 330, 340. Each block 310, 320, 330, 340 may comprise one or more distributed ledger entries. The distributed ledger entry may comprise end user information, a hash (e.g., encrypted version, etc.) of end user information, a query, a hash of a query, a response to a query, a hash of a response to a query, etc. Each block 310, 320, 330, 340 may comprise a hash of a key ($H_{PubKey310}$, $H_{PubKey320}$, $H_{PubKey330}$, $H_{PubKey340}$) of the device. The key may comprise a public key of the device. The public key may be unique to the device. The public key may be paired with a private key of the device. Each block 310, 320, 330, 340 may comprise an address of the device ($A_{310}$, $A_{320}$, $A_{330}$, $A_{340}$). The address may comprise a hash of the key ($H_{PubKey310}$, $H_{PubKey320}$, $H_{PubKey330}$, $H_{PubKey340}$) of the device, such as the public key of the device.

Each block 310, 320, 330, 340 may comprise a timestamp ($TS_{310}$, $TS_{320}$, $TS_{330}$, $TS_{340}$). The timestamp ($TS_{310}$, $TS_{320}$, $TS_{330}$, $TS_{340}$) may indicate when the block 310, 320, 330, 340 was generated. The inclusion of the timestamps ($TS_{310}$, $TS_{320}$, $TS_{330}$, $TS_{340}$) may link the blocks 310, 320, 330, 340.

Each block generated after a genesis block 320, 330, 340 may comprise a hash of the previous block ($H_{Block310}$, $H_{Block320}$, $H_{Block330}$) in the distributed ledger 300. The inclusion of the hash of the previous block ($H_{Block310}$, $H_{Block320}$, $H_{Block330}$) in the distributed ledger 300 may link the blocks 310, 320, 330, 340. The inclusion of the hash of the previous blocks ($H_{Block310}$, $H_{Block320}$, $H_{Block330}$) in the distributed ledger 300 may comprise an iterative chain of hash functions. The linking of the blocks 310, 320, 330, 340 may deter unauthorized tampering or breaching of the distributed ledger 300. Tampering with a block 310, such as retroactively modifying the block 310, may require modification of the subsequent blocks 320, 330, 340. The computing power or labor to tamper or breach the distributed ledger 300 may deter targeting of the distributed ledger 300 by an unauthorized entity.

Each block 310, 320, 330, 340 may comprise a signature ($Sig_{310}$, $Sig_{320}$, $Sig_{330}$, $Sig_{340}$). The signature ($Sig_{310}$, $Sig_{320}$, $Sig_{330}$, $Sig_{340}$) may comprise an encryption with a key of the device, such as the private key of the device. The signature ($Sig_{310}$, $Sig_{320}$, $Sig_{330}$, $Sig_{340}$) may comprise an encryption of one or more of the address of the device ($A_{310}$, $A_{320}$, $A_{330}$, $A_{340}$), the hash of the key ($H_{PubKey310}$, $H_{PubKey320}$, $H_{PubKey330}$, $H_{PubKey340}$), the timestamp ($TS_{310}$, $TS_{320}$, $TS_{330}$, $TS_{340}$) and the hash of the previous block ($H_{Block310}$, $H_{Block320}$, $H_{Block330}$). The signature ($Sig_{310}$, $Sig_{320}$, $Sig_{330}$, $Sig_{340}$) may deter unauthorized tampering with the distributed ledger 300. The private key used to sign may be necessary to generate or retroactively modify a block or entry of the distributed ledger 300. Only the device or entity with the private key may alter or add to the distributed ledger 300. The device or the entity may comprise an administrator of the distributed ledger 300.

The distributed ledger 300 may comprise a genesis block 310. The genesis block 310 may comprise the first block of the distributed ledger 300. The genesis block 310 may comprise the oldest block or the first block generated of the distributed ledger 300. Participant nodes may generate the subsequent blocks 320, 330, 340 of the distributed ledger 300.

The distributed ledger 300 may be stored at a distributed network. The distributed ledger 300 may be stored across nodes, such as the nodes 110 of FIG. 1, in a distributed network, such as the network 100 of FIG. 1. The nodes may comprise computing devices. The nodes may comprise associated devices.

The distributed ledger 300 may be updated. Updating the distributed ledger 300 may comprise creating a distributed ledger entry. Updating the distributed ledger 300 may comprise transmitting a distributed ledger entry to the distributed ledger 300. Updating the blockchain may comprise recording the distributed ledger entry in a block 310, 320, 330, 340 of the distributed ledger 300. Updating the blockchain may comprise creating a block 310, 320, 330, 340 of the distributed ledger 300.

The distributed ledger 300 may be updated by a computing device or an application. The distributed ledger 300 may be updated by a participant node. Updating the distributed ledger 300 may comprise creating a distributed ledger entry, such as using the custom software library. Updating the distributed ledger 300 may comprise a participant node mining a distributed ledger entry into the distributed ledger 300. Updating the distributed ledger 300 may comprise a participant node performing a proof of stake algorithm with a distributed ledger entry. Updating the distributed ledger 300 may comprise a participant node performing a proprietary "proof of reputation stake" algorithm with a distributed ledger entry.

Figure 4:
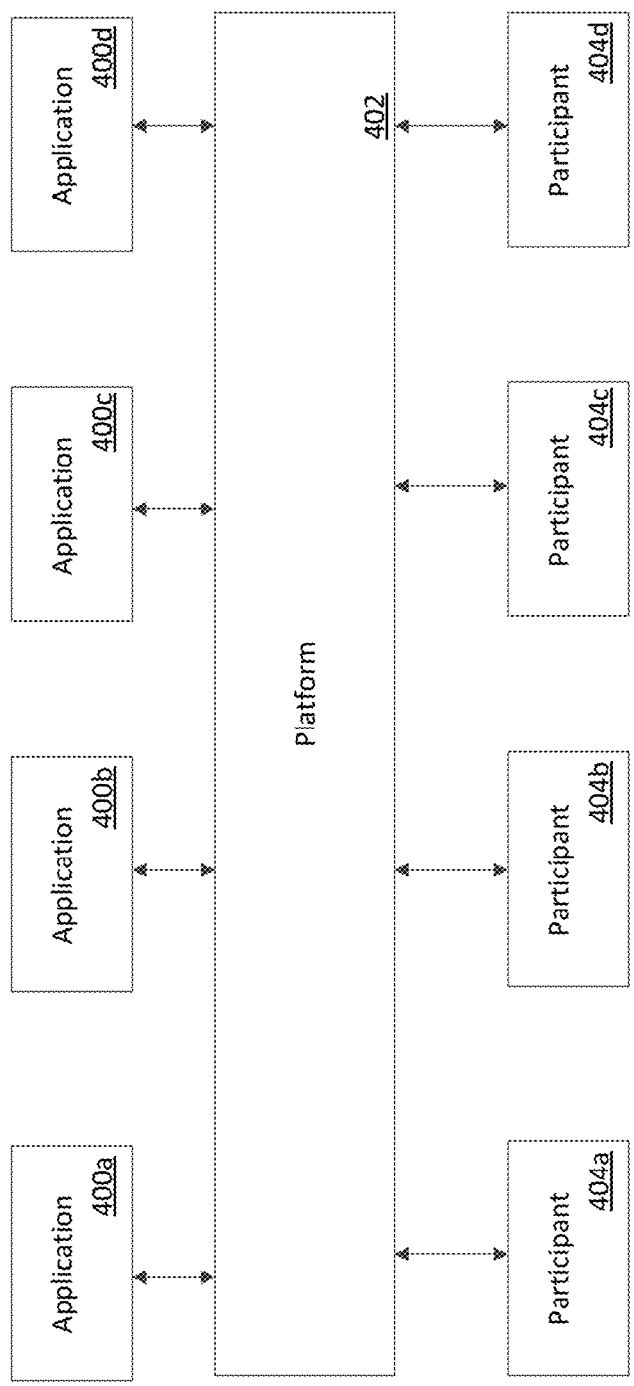
FIG. 4 shows an example relationship arrangement between applications and participants.

FIG. 4 shows an example relationship arrangement between applications 400a, 400b, 400c, 400d and participants 404a, 404b, 404c, 404d. One or more of the participants 404a, 404b, 404c, 404d may access the one or more applications 400a, 400b, 400c, 400d via a platform 402.

The one or more applications 400a, 400b, 400c, 400d may provide tools to allow the one or more participants 404a, 404b, 404c, 404d to share data. The one or more applications 400a, 400b, 400c, 400d may allow the one or more participants 404a, 404b, 404c, 404d to use data shared by the participants across a variety of business functions for personalized experiences and/or targeted advertising. The one or more applications 400a, 400b, 400c, 400d may comprise applications for targeting, analytics, attribution, ratings, the like, and/or any combination of the foregoing regarding content, demographics, advertising, etc. The one or more applications 400a, 400b, 400c, 400d may be genera by third parties. The one or more applications 400a, 400b, 400c, 400d may be generated by teams internal to the one or more participants 404a, 404b, 404c, 404d. The one or more applications 400a, 400b, 400c, 400d may be provided through a cloud computing environment. The one or more applications 400a, 400b, 400c, 400d may be provided through a network computing environment.

The platform 402 may provide the one or more applications 400a, 400b, 400c, 400d for the one or more participants 404a, 404b, 404c, 404d. The platform 402 may certify the one or more applications 400a, 400b, 400c, 400d. The platform 402 may comprise a certification authority. The certification authority may certify applications. Certification by the platform 402 of an application may indicate one or more parameters are met. The one or more applications 400a, 400b, 400c, 400d may be generated using one or more application programming interfaces (APIs) provided by the platform 402. The platform 402 may be implemented in a cloud computing environment. The platform 402 may be implemented in a network computing environment. The platform 402 may comprise a developer community. The platform 402 may comprise a research and development group. The platform 402 may comprise a distributed community, free of centralized control and/or ownership. The platform 402 may comprise a global community. The platform 402 may be implemented by one or more entities, such as companies, corporations, and/or startups, as examples.

The participants 404a, 404b, 404c, 404d may access the platform 402 via nodes. The one or more participants 404a, 404b, 404c, 404d may comprise data owners. The one or more participants 404a, 404b, 404c, 404d may share data and/or insights securely. The one or more participants 404a, 404b, 404c, 404d may comprise one or more computing devices in communication with a cloud computing environment. The one or more participants 404a, 404b, 404c, 404d may comprise one or more computing devices in communication with a network computing environment. The one or more participants 404a, 404b, 404c, 404d may communicate with each other using a peer-to-peer distributed data platform. The peer-to-peer distributed data platform may be ran by the one or more participants 404a, 404b, 404c, 404d. The peer-to-peer distributed data platform may comprise a blockchain.

The one or more participants 404a, 404b, 404c, 404d may comprise marketers. Marketers may reduce spending by using data from the platform 402 and/or the peer-to-peer distributed data platform to reduce marketing spending by uniquely targeting customers across screens. Marketers may use data from the platform 402 and/or the peer-to-peer distributed data platform to measure return on investment by linking customer viewership, purchases, and exposure data.

The one or more participants 404a, 404b, 404c, 404d may comprise publishers. Publishers may use data from the platform 402 and/or the peer-to-peer distributed data platform to de-duplicate audience reach across screens. Publishers may use data from the platform 402 and/or the peer-to-peer distributed data platform to improve yield by more efficient planning and targeting.

The one or more participants 404a, 404b, 404c, 404d may comprise operators and/or distributors. The operators and/or distributors may use the platform 402 and/or the peer-to-peer distributed data platform to monetize "walled off" audience data securely and safely, while protecting sensitive subscriber information.

One of the one or more applications may comprise a blind identification-based targeting application. The blind identification-based targeting application may allow two or more participants to anonymously match specific audience identifiers. The audience identifiers may comprise customer, client, and/or subscriber identifiers, as examples. The blind identification-based targeting application may allow dynamic targeting of specific audience identifiers.

One of the one or more applications may comprise an attribute/demographic targeting application. The attribute/demographic targeting application may allow participants to extend reach by allowing participants to specify attributes and/or demographics of end users to be targeted and allowing participants to rent identifiers with the specified attributes and/or demographics from other participants. Specified attributes may comprise specified behavioral patterns. Specified attributes may comprise specified locations visited. Specified attributes may comprise specified content consumed.

One of the one or more applications may comprise a distributed analytics application. A participant may use the distributed analytics application to obtain insights from other participants' end users' private data to inform planning, measurement, attribution, and other analytic requests.

Figure 5:
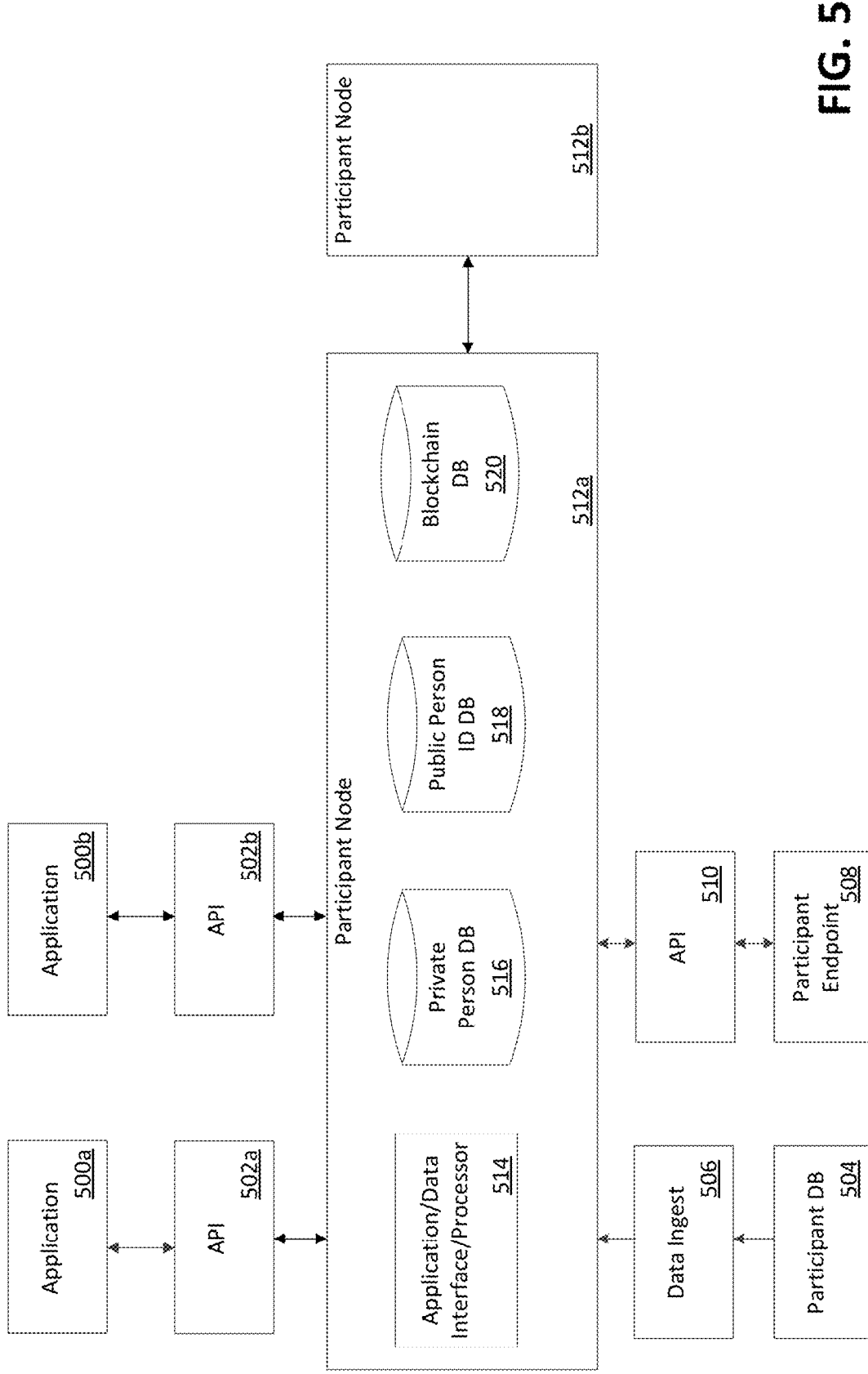
FIG. 5 shows an example conceptual architecture.

FIG. 5 shows an example conceptual architecture. The example conceptual architecture comprises one or more participant nodes 512a, 512b. Each participant 404a, 404b, 404c, 404d in FIG. 4 may comprise one or more of the one or more participant nodes 512a, 512b. Each participant node 512a, 512b may be implemented in a cloud computing environment. Each participant node 512a, 512b may be implemented in a network computing environment. Each participant node 512a, 512b may be implemented in a virtual private cloud (VPC).

Each participant node 512a, 512b may use one or more applications 500a, 500b. The one or more applications 500a, 500b may comprise one or more applications 400a, 400b, 400c, 400d from FIG. 4. The one or more applications 500a, 500b may implement one or more application programming interfaces (APIs) 502a, 502b. The one or more applications 500a, 500b may be accessed using one or more application programming interfaces (APIs) 502a, 502b.

Each participant node 512a, 512b may receive data from one or more respective participant database(s) 504 via a respective data ingestion module 506. The data ingestion module may comprise one or more sets of computer instructions for obtaining and importing bulk data to a respective participant node 512a, 512b. Data in the respective participant database 504 and/or imported by the data ingestion module 506 may comprise participant end user (e.g., customer, consumer, subscriber, etc.) data.

Each participant node 512a, 512b may receive data from a respective participant endpoint 508. The respective participant endpoint 508 may comprise a device that a participant end user uses to employ services of the participant. The device may comprise a content consumption device, a display, a television, a computer, and/or a smartphone, as examples. As an end user uses the respective participant endpoint 508, the respective participant endpoint 508 may send (e.g., transmit, transfer, etc.) signals to the respective participant node 512a. The respective participant endpoint 508 may implement one or more application programming interfaces (APIs) 510. The respective participant endpoint 508 may access one or more application programming interfaces (APIs) 510 to help transfer signals to the respective participant node 512a. Each participant node 512a, 512b, may receive data from multiple respective endpoints 508.

Each participant node 512a, 512b may comprise an application and/or data interface and/or processor 514. The application, data interface, and/or processor 514 may comprise computer hardware. The application, data interface, and/or processor 514 may comprise one or more sets of computer instructions. The application and/or data interface and/or processor 514 may handle (e.g., control, initiate, orchestrate, etc.) interactions with the applications 500a, 500b. The application and/or data interface and/or processor 514 may receive and control the storage of data received from the respective participant database 504. The application, data interface, and/or processor 514 may receive and control the processing of signals received from the respective participant endpoint 508. The application, data interface, processor 514 service modules, and/or microservice modules.

Each participant node 512a, 512b may comprise a private person database 516. The private person database 516 may comprise all of the data received from the one or more respective participant database(s) 504. The private person database 516 may comprise private data received from the one or more respective participant database(s) 504. The private person database 516 may comprise all of the data received from the one or more respective participant endpoint(s) 508. The private person database 516 may comprise private data received from the one or more respective participant endpoint(s) 508.

Each participant node 512a, 512b may comprise a public person identifier database 518. The public person identifier database 58 may comprise a cryptographically secure index of pseudonymized person identifiers ("Public Person IDs" or "PPIDs") from the applicable participant's collected data. The public person identifier database 518 may store public data received from the one or more respective participant database(s) 504. The public person identifier database 518 may store public data received from the one or more respective participant endpoint(s) 508. Device information ("signals") from the one or more respective participant endpoint(s) 508 and/or the one or more respective participant database(s) 504 may be cryptographically transformed, and then populated in the public person identifier database 518. The transformed signals may be linked to PPIDs, together forming mapping elements.

Each participant node 512a, 512b may comprise a blockchain database 520. The blockchain database 520 may comprise a local copy of the blockchain. Each participant node 512a, 512b may alter the blockchain via a proprietary "proof of reputation" stake algorithm. The mapping elements may be added to the blockchain by a respective participant node 512a, 512b. The mapping elements may be propagated across a peer-to-peer network to all participant nodes 512a, 512b, by a respective participant node. Each participant node, such as participant node 512a, may communicate with another participate node, such as 512b, using a peer-to-peer protocol.

Figure 6:
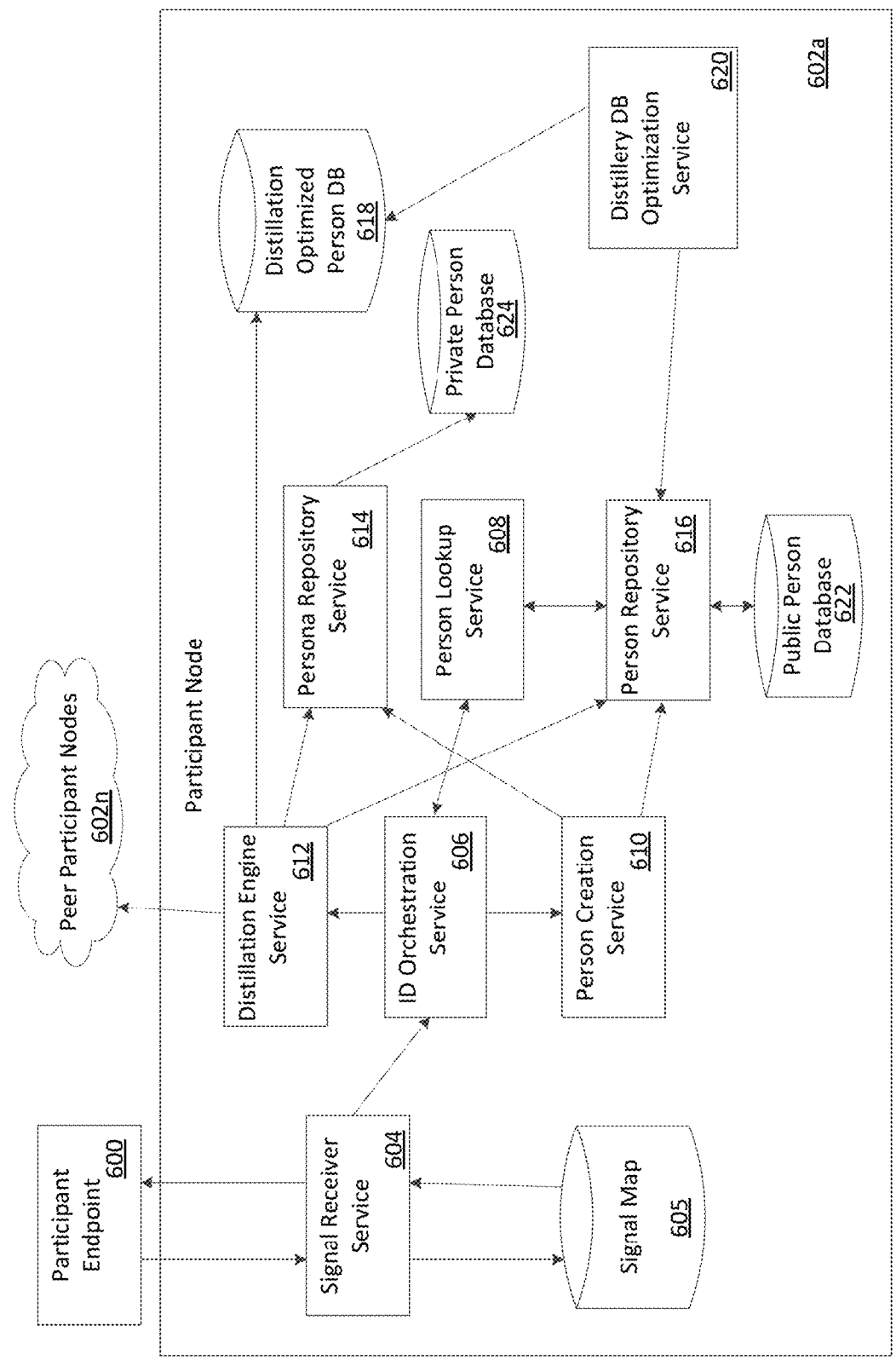
FIG. 6 shows an example block diagram of a node.

FIG. 6 shows an example block diagram of a participant node 602a. The participant node 602a may be in communication with a participant endpoint 600. The participant node 602a may be in communication with one or more peer participant nodes 602n. Each participant 404a, 404b, 404c, 404d in FIG. 4 may comprise a participant node 602a. One or more participants 404a, 404b, 404c, 404d in FIG. 4 may comprise one or more peer participant nodes 602n. The participant node 602a may comprise a participant node 512a, 512b in FIG. 5. The one or more peer participant nodes 602n may comprise a participant node 512a, 512b in FIG. 5.

The participant node 602a may comprise a signal receiver service module 604, a signal map 605, an identifier orchestration service module 606, a person lookup service module 608, a person generation service module 610, a distillation engine service module 612, a persona repository service module 614, a person repository service module 616, a distillation optimized person database 618, a distillery database optimization service module 620, a public person database 622, and a private person database 624. The signal receiver service module 604, the identifier orchestration service module 606, the person lookup service module 608, the person generation service module 610, the distillation engine service module 612, the persona repository service module 614, the person repository service module 616, and/or the distillery database optimization service module 620 may comprise one or more sets of computer instructions. The signal map 605, the distillation optimized person database 618, the public person database 622, and/or the private person database 624 may comprise data storage.

The distillery database optimization service module 620 may key a lookup table with data from transformed signals that correspond to each person record that comprises data from the signals. The person repository service module 616 may receive the lookup table from the distillery database optimization service module 620. The distillation optimized person database 618 may receive the lookup table from the distillery database optimization service module 620.

The participant endpoint 600 may submit a signal package to the signal receiver service module 604 of the participant node 602a. The signal receiver service module 604 may parse signals in the signal package. The signal receiver service module 604 may hash the parsed signals. The signal receiver service module 604 may transmit the hashed signals to the signal map 605. The signal map 605 may identify a public person identifier (PPID) that corresponds to the hashed signals and transmit the identified PPID to the signal receiver service module 604. The signal receiver service module 604 may return a ticket comprising the identified PPID to the participant endpoint 600. The signal receiver service module 604 may push the signal package, the hashed signals, and the identified PPID to the identity orchestrator service module 606.

The identity orchestrator service module 606 may query the hashed signals against the person lookup service module 608. The person lookup service module 608 may in turn pass the hashed signals to the person repository service module 616. The person repository service module 616 may pass the hashed signals to the public person database 622 and receive a list of persons comprising one or more of the hashed signals, and associated signals and metadata, from the public person database 622. The person repository service module 616 may pass the list of persons and associated signals and metadata to the person lookup service module 608. The person lookup service module 608 may pass the list of persons and associated signals and metadata to the identity orchestrator service module 606.

If the list of persons is empty, then the identity orchestrator service module 606 may push the hashed signals to the person generation service module 610. If the list of persons is empty, then no match with the hashed signals may be found. If the list of persons is empty, then no match with sufficient precision with the hashed signals may be found. The person generation service module 610 may use the hashed signals to generate a new person. The person generation service module 610 may push the new person to the persona repository service module 614. The persona repository service module 614 may add the new person to the private person database 624. The person generation service module 610 may push the new person to the person repository service module 616. The person repository service module 616 may add the new person to the public person database 622.

If the list of persons is not empty, then the identity orchestrator service module 606 may push the list of persons and associated signals and metadata to the distillation engine service module 612. The distillation engine service module 612 may comprise an Apache Kafka platform. The distillation engine service module 612 may comprise a component comprising an Apache Kafka platform. The distillation engine service module 612 may be in communication with an Apache Kafka platform. The distillation engine service module 612 may group sets of PPIDs and associated signal sets. The identity orchestrator service module 606 may push the list of persons and associated signals and metadata to the Apache Kafka platform and the distillation engine service module 612 may pull PPIDs and associated signal sets from the Apache Kafka platform. The distillation engine service module 612 may scale horizontally.

The distillation engine service module 612 may run a distillation algorithm to distill data (e.g., the list of persons and associated signals and metadata, etc.). An example distillation algorithm is described below in reference to FIGS. 7-9. After the distillation algorithm is performed, the distillation engine service module 612 may use the distilled data to update the distillation optimized person database 618. After the distillation algorithm is performed, the distillation engine service module 612 may transmit the distilled data to the person repository service module 616, the persona repository service module 614, and peer participant nodes 602n. The person repository service module 616 may use the distilled data to update the public person database 622. The persona repository service module 614 may use the distilled data to update the private person database 624. The peer participant nodes 602n may use the distilled data to update respective local database records, as well as distributed ledger (blockchain) records.

FIG. 7 shows an example data distillation method. An endpoint signal package 700 may be received at a participant node, such as the participant node 602a in FIG. 6, from a participant endpoint, such as the participant endpoint 600 in FIG. 6. The example data distillation method may be performed by the participant node. The example data distillation method may be performed by the distillation engine service module 612 in FIG. 6. The endpoint signal package 700 may comprise a set of signals 702, 704, 706. The set of signals 702, 704, 706 may comprise transformed signals. A signal 702 may comprise a user identifier. The user identifier may comprise a value of ABF38A9F. The user identifier may identify a user and/or device with 1.00 (100%) precision. A signal 704 may comprise an advertisement identifier. The advertisement identifier may comprise a value of FD93698A. The advertisement identifier may identify a user and/or device with 0.80 (80%) precision. A signal 706 may comprise an Internet Protocol (IP) address. The IP address may comprise a value of 839285BB. The IP address may identify a user and/or device with 0.20 (20%) precision.

The participant node may pull each person record with a signal that matches a signal in the endpoint signal package 700. The participant node may pull each person record with a signal above a threshold precision that matches a signal in the endpoint signal package 700. The threshold precision may be 0.80 (80%), 0.60 (60%), 0.50 (50%), or any other precision. The person records may be pulled from an internal database. The person records may be pulled from a distributed ledger, such as a blockchain). Person records 710, 720 may be returned based on the signals in the endpoint signal package 700. A person record 710 may be returned based on the signal 702 in the endpoint signal package 700. A person record 720 may be returned based on the signal 704 in the endpoint signal package 700.

The person record 710 may comprise a public person identifier of ABCDEFGH. The person record 710 may comprise a set of signals 712, 714, 716. The set of signals 712, 714, 716 may comprise transformed signals. A signal 712 may comprise a user identifier. The user identifier may comprise a value of ABF38A9F. The user identifier may identify a user and/or device with 1.00 (100%) precision. A signal 714 may comprise an identifier for advertisers. The identifier for advertisers may comprise a value of C1D02830. The identifier for advertisers may identify a user and/or device with 0.80 (80%) precision. A signal 716 may comprise an Internet Protocol (IP) address. The IP address may comprise a value of 56A740BC. The IP address may identify a user and/or device with 0.20 (20%) precision.

The person record 720 may comprise a public person identifier of IJKLMNOP. The person record 720 may comprise a set of signals 722, 724. The set of signals 722, 724 may comprise transformed signals. A signal 722 may comprise an advertisement identifier. The advertisement identifier may comprise a value of FD93698A. The advertisement identifier may identify a user and/or device with 0.80 (80%) precision. A signal 724 may comprise a telephone number. The telephone number may comprise a value of 12309847. The telephone number may identify a user and/or device with 0.40 (40%) precision.

The participant node may generate an ordered signal list 730. The distillation engine service module 612 in FIG. 6 may generate an ordered signal list 730. The ordered signal list 730 may comprise each unique signal from the endpoint signal package 700, the person record 710, and the person record 720 and a corresponding precision. The ordered signal list 730 may be ordered such that signals with a higher precision appear before signals with a lower precision.

FIG. 8 shows an example data distillation method. The example data distillation method may be performed by the participant node 602a in FIG. 6. The example data distillation method may be performed by the distillation engine service module 612 in FIG. 6. Unique signals from the endpoint signal package 700 in FIG. 7 may be added to the person record 710 in FIG. 7 to form a person record 800. The person record 800 may comprise a signal 802, which may comprise the signal 712 in FIG. 7. The person record 800 may comprise a signal 804, which may comprise the signal 714 in FIG. 7. The person record 800 may comprise a signal 806, which may comprise the signal 716 in FIG. 7. The person record 800 may comprise a signal 808, which may comprise the signal 704 in FIG. 7. The person record 800 may comprise a signal 810, which may comprise the signal 706 in FIG. 7.

Unique signals from the endpoint signal package 700 in FIG. 7 may be added to the person record 720 in FIG. 7 to form a person record 820. The person record 820 may comprise a signal 822, which may comprise the signal 722 in FIG. 7. The person record 820 may comprise a signal 824, which may comprise the signal 724 in FIG. 7. The person record 820 may comprise a signal 826, which may comprise the signal 702 in FIG. 7. The person record 820 may comprise a signal 828, which may comprise the signal 706 in FIG. 7. An ordered signal list 830 may comprise the ordered signal list 730 in FIG. 7.

The participant node may generate a signal hash map 840. The distillation engine service module 612 in FIG. 6 may generate a signal hash map 840. The signal hash map 840 may pair signals with one or more person records. Each signal in the ordered signal list 830 may comprise a corresponding row in the signal hash map 840. For each row in the signal hash map 840, if a corresponding signal appears in the person record 800, then a corresponding public person identifier (ABCDEFGH) may be associated with the corresponding signal. For each row in the signal hash map 840, if a corresponding signal appears in the person record 820, then a corresponding public person identifier (IJKLMNOP) may be associated with the corresponding signal.

Figure 9:
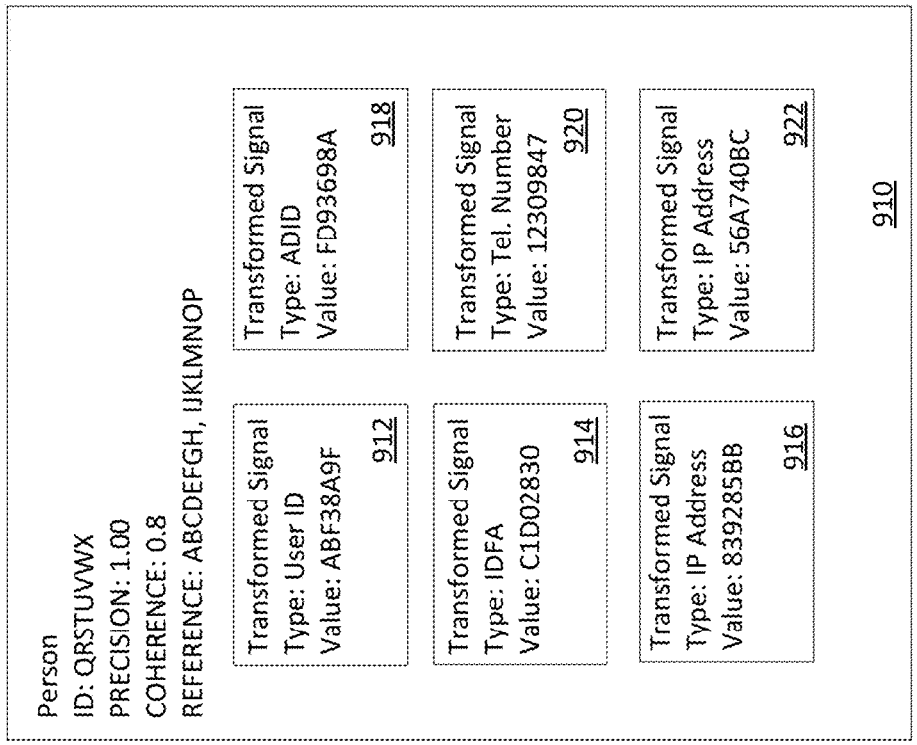
FIG. 9 shows an example data distillation method.

FIG. 9 shows an example data distillation method. The example data distillation method may be performed by the participant node 602a in FIG. 6. The example data distillation method may be performed by the distillation engine service module 612 in FIG. 6. A signal hash map 900 may comprise the signal hash map 840 in FIG. 8. The participant node may merge the old person records (800 and 820 in FIG. 8) into a single new person record 910. The participant node may remove the old person records (800 and 820 in FIG. 8).

The new person record 910 may comprise a new public person identifier comprising the value QRSTUVWX. The new person record 910 may comprise at least one signal that identifies a user and/or device with 1.00 (100%) precision. The new person record 910 may comprise a set of signals 912, 914, 916, 918, 920, 922. The new person record 910 may use the old person records with public person identifiers ABCDEFGH and IJKLMNOP as references for adding the set of signals 912, 914, 916, 918, 920, 922.

The new person record 910 may comprise a signal 912, which may comprise the signal 802 in FIG. 8. The new person record 910 may comprise a signal 914, which may comprise the signal 804 in FIG. 8. The new person record 910 may comprise a signal 916, which may comprise the signal 810 in FIG. 8. The new person record 910 may comprise a signal 918, which may comprise the signal 808 in FIG. 8. The new person record 910 may comprise a signal 920, which may comprise the signal 824 in FIG. 8. The new person record 910 may comprise a signal 922, which may comprise the signal 806 in FIG. 8.

Figure 10:
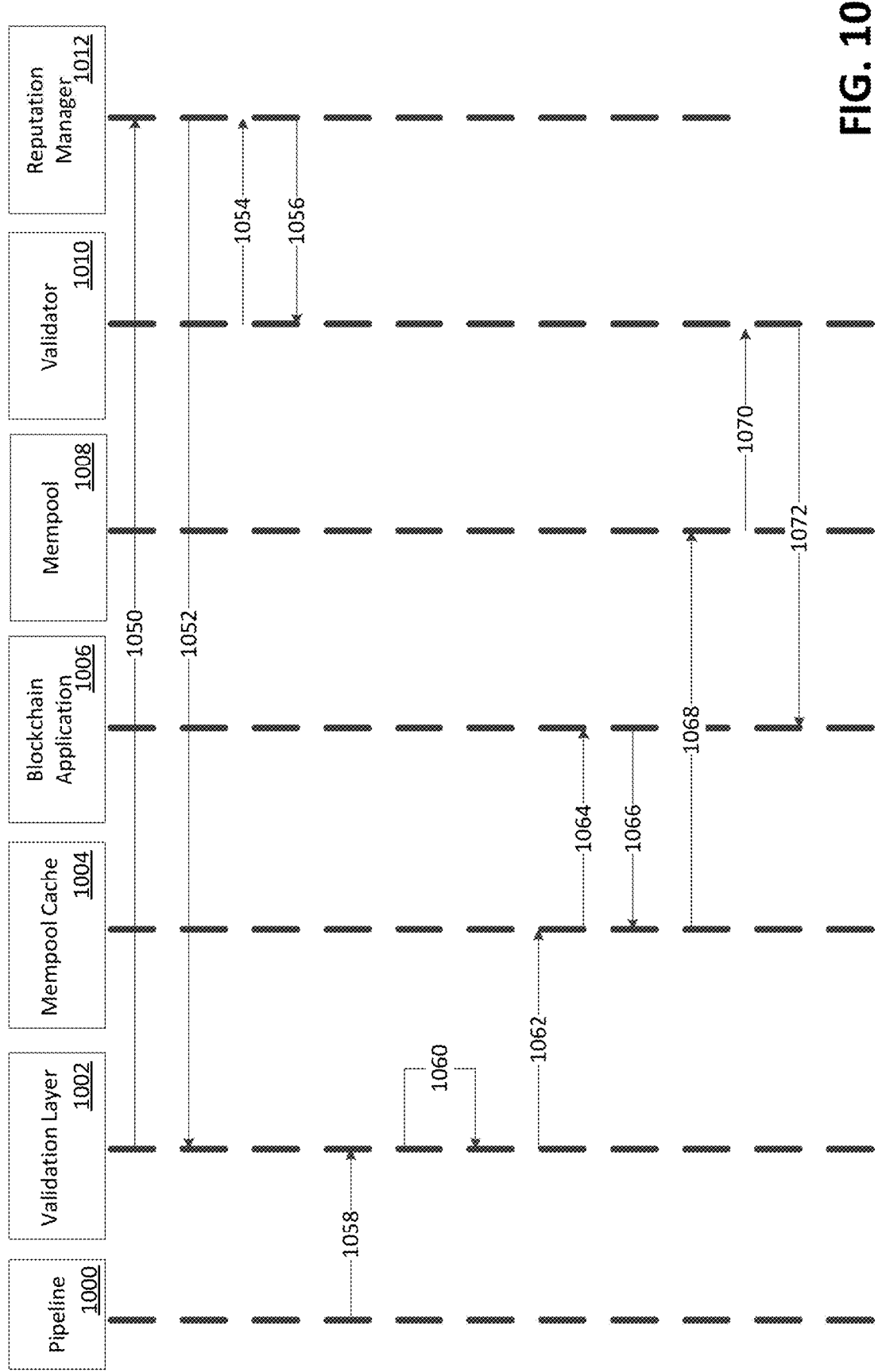
FIG. 10 shows an example sequence diagram of reputation-based consensus process.

FIG. 10 shows an example sequence diagram of reputation-based distributed consensus process. The sequence diagram may comprise a pipeline 1000, node components 1002, 1004, 1006, a mempool 1008, a validator 1010, and/or a reputation manager 1012. The pipeline 1000 may comprise an Apache Kafka data pipeline. The pipeline 1000 may comprise potential transactions to be added to a blockchain.

Each node of the blockchain may comprise a validation layer 1002. The validation layer 1002 may comprise one or more sets of computer instructions. The validation layer 1002 may validate transactions. Each node of the blockchain may comprise a mempool cache 1004. The mempool cache 1004 may comprise a local version of the mempool 1008. Each node of the blockchain may comprise a blockchain application 1006. The blockchain application 1006 may comprise one or more sets of computer instructions. The blockchain application 1006 may allow a node to interact with the blockchain. The blockchain application 1006 may allow a node to obtain a status of the blockchain.

The mempool 1008 may comprise a list (e.g., queue, etc.) of transactions to be added to the blockchain. The validator 1010 may comprise one or more of the nodes of the blockchain currently selected by a proprietary "proof of reputation staking" algorithm. The one or more nodes selected as the validator 1010 may change and/or be voted on after each block is added to the blockchain. The validator 1010 may mint blocks on the blockchain. The reputation manager 1012 may maintain a reputation score for each node of the blockchain.

At 1050, the validation layer 1002 may request a reputation from the reputation manager 1012. At 1052, the reputation manager 1012 may return a reputation corresponding to an entity related to a node comprising the validation layer 1002. At 1054, the validator 1010 may request a reputation from the reputation manager 1012. At 1056, the reputation manager 1012 may return a reputation corresponding to one or more entities related to the validator 1010.

At 1058, the node may pull a potential transaction from the pipeline 1000 and give the pulled potential transaction to a respective validation layer 1002. At 1060, the validation layer 1002 may determine if a pulled potential transaction is valid. A pulled potential transaction may be invalid if the pulled potential transaction is in an invalid format, is from an invalid source, does not have enough money to cover a transaction fee, etc. At 1062, in response to determining that the pulled potential transaction is valid, the pulled potential transaction may be added to the mempool cache 1004 of the node.

At 1064, the node may use a respective blockchain application 1006 to request a status of the blockchain. At 1066, the blockchain application 1006 may return a status of the blockchain. The node may use the status of the blockchain to determine if the potential transaction is valid in light of the blockchain. A transaction may be invalid in light of the blockchain if the transaction indicates payment of fees from a wallet that has no money, etc. The node may use the status of the blockchain to prepare the transaction to enter the mempool 1008. At 1068, the node may transfer the transaction from the mempool cache 1004 to the mempool 1008.

The mempool 1008 may broadcast the transaction to the nodes of the blockchain. The mempool 1008 may prepare the transaction as a block. At 1070, the mempool 1008 may propose that the validator 1010 add the prepared block to the blockchain. The nodes and/or validator 1010 may vote to determine if the block should be added to the blockchain. If a consensus of nodes and/or the validator 1010 decide that the block should be added to blockchain, then the validator 1010 may commit the block to the blockchain using the blockchain application 1006 at 1072.

Figure 11:
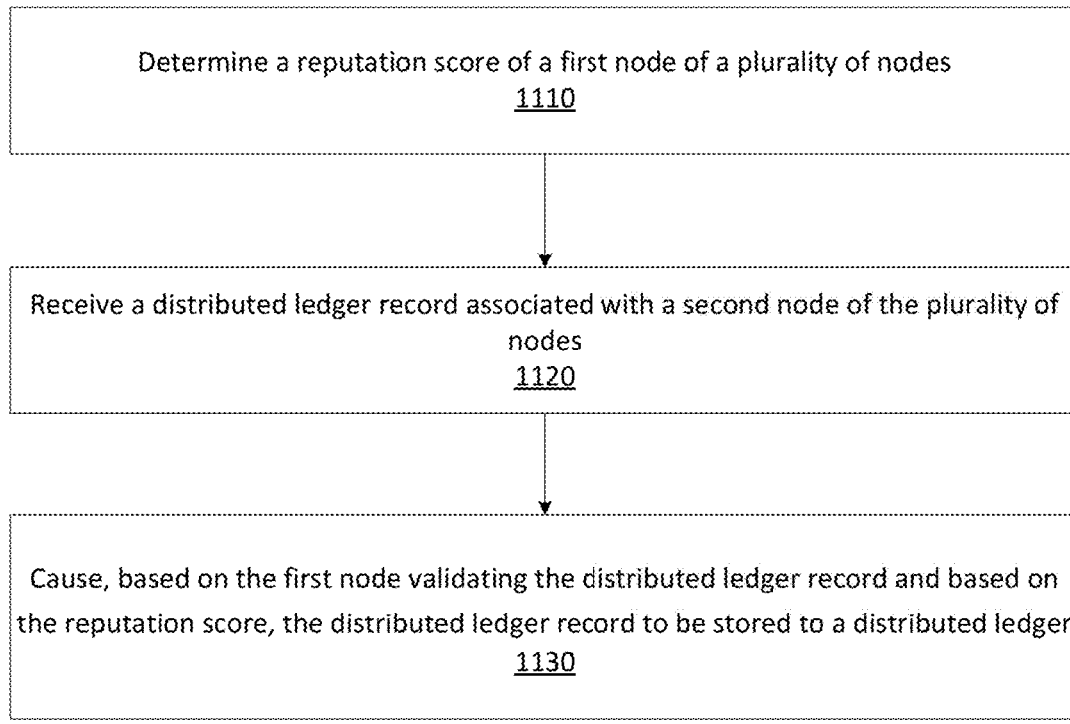
FIG. 11 shows an example method.

FIG. 11 shows an example method. At step 1110, a reputation score of a first node of a plurality of nodes may be determined. The participant node 602a in FIG. 6 may determine a reputation score of a first node of a plurality of nodes. The reputation score may be based on a frequency of generation of distributed database records by the first node. The distributed database records may be stored in a distributed database, such as a Byzantine fault tolerant database. The distributed database may be associated with a data sharing platform, such as a platform for service providers to share data associated with users and/or content. The distributed database records may comprise queries, such as from service providers, associated with a user and/or content. The distributed database records may comprise responses to the queries, such as from other service providers.

The reputation score may be based on a frequency and/or amount of data provided by the first node, such as to the data sharing platform. The reputation score may be based on a level of technical maintenance of the first node. The plurality of nodes may be each associated with at least one of a content provider, a content creator, a retailer, or a service provider.

At step 1120, a distributed ledger record associated with a second node of the plurality of nodes may be received. The participant node 602a in FIG. 6 may receive a distributed ledger record associated with a second node of the plurality of nodes. The second node may be associated with a content provider. The distributed ledger record may comprise an indication of a user of a service of the content provider. The indication of the user may comprise a function of a hash of personal identifying information of the user. The distributed ledger record may comprise an indication that a response to a query was provided by a third node of the plurality of nodes. The distributed ledger record may comprise an indication that a response was provided from a first service provider to a query from a second service provider. The distributed ledger record may comprise an indication of the source of the query and/or the source of the response to the query. The query may be associated with behavior of a user. The distributed ledger record may be sent to the first node. The participant node 602a in FIG. 6 may send the distributed ledger record to the first node. The sending the distributed ledger record to the first node may be based on determining that the reputation score of the first node satisfies a threshold value. The threshold value may comprise a minimum value required for validation of the distributed ledger record.

At step 1130, the distributed ledger record may be caused to be stored to a distributed ledger based on the first node validating the distributed ledger record and based on the reputation score. The participant node 602a in FIG. 6 may cause the distributed ledger record to be stored to a distributed ledger based on the first node validating the distributed ledger record and based on the reputation score. The first node may be configured to validate the distributed ledger record based on a determination that the distributed ledger record comprises data that is consistent with data stored to the distributed ledger. The first node may be configured to validate the distributed ledger record based on a determination that the distributed ledger record comprises data that does not contradict data stored to the distributed ledger. The first node may be configured to validate the distributed ledger record based on a determination that the distributed ledger record comprises data that has not been stored to the distributed ledger.

The causing the distributed ledger record to be stored to the distributed ledger may be based on a sum of the reputation score of the first node and a reputation score of a third node validating the distributed ledger record. The causing the distributed ledger record to be stored to the distributed ledger may be based on the sum satisfying a threshold value. The threshold value may comprise a minimum value required for validation of the distributed ledger record. The sum satisfying the threshold value may comprise the sum meeting or exceeding the threshold value. The causing the distributed ledger record to be stored to the distributed ledger may be based on a third node validating the distributed ledger record. The causing the distributed ledger record to be stored to the distributed ledger may be based on a determination that the distributed ledger record comprises data that has not been stored to the distributed ledger.

The distributed ledger record may be sent to a third node. The participant node 602a in FIG. 6 may send the distributed ledger record to a third node. The causing the distributed ledger record to be stored to the distributed ledger may be based on the third node validating the distributed ledger record.

The causing the distributed ledger record to be stored to the distributed ledger may be based on a sum of the reputation score of the first node and a reputation score of the third node satisfying a threshold value. A bill may be sent to a user associated with the second node based on the distributed ledger record being stored to the distributed ledger. The participant node 602a in FIG. 6 may send a bill to a user associated with the second node based on the distributed ledger record being stored to the distributed ledger. A bill may be sent to a party that sent data to the second node based on the distributed ledger record being stored to the distributed ledger.

An entity associated with a participant node may make timely payments to a platform, frequently submit information to the platform, and maintain the respective participant node with no technical problems. The participant node associated with the entity may comprise a high reputation score. A plurality of participant nodes may elect the participant node as a validator based on a proof of reputation staking protocol and the high reputation score. A second participant node may submit information about a user's content consumption as a transaction in a mempool associated with the platform. The participant node elected as the validator may retrieve the transaction from the mempool and create a block comprising the transaction in a blockchain associated with the platform.

For example, a reputation score of a server of a content distributor. A score associated with technical maintenance of the server may be determined to be a value of 2. A score associated with data provided to a data exchange platform by the server may be determined to be a value of 4. A score associated with timeliness of payments from the content distributor for data received and/or accessed via the data exchange platform may be determined to be a value of 3. Based on the three scores, the server may be determined to have a reputation score of 9.

A blockchain node may receive data from a server of an advertising agency and/or an indication that the server provided data. The blockchain node may generate a blockchain transaction comprising the data and/or an indication that the server provided data. Based on the reputation score of the first node being equal or greater than a threshold value of 8, the blockchain node may send the transaction to the first node.

The blockchain node may receive an indication of a vote from the first node to validate the transaction. Based on the vote to validate the transaction, the blockchain node may add the transaction to a block. The blockchain node may add the block to a blockchain.

For example, a server associated with a data exchange platform may receive data from a computing device associated with a digital services provider. The data may be associated with viewership of digital content. The data may be a response to a query from a content producer. The data may be stored to a distributed database, such as a Byzantine fault tolerant database comprising records of the digital services provider. The server may determine that the computing device has a reputation score of 6. Based on the reputation score of the computing device being above a value of 5, the server may store an indication that the computing device provided data on a distributed ledger.

Figure 12:
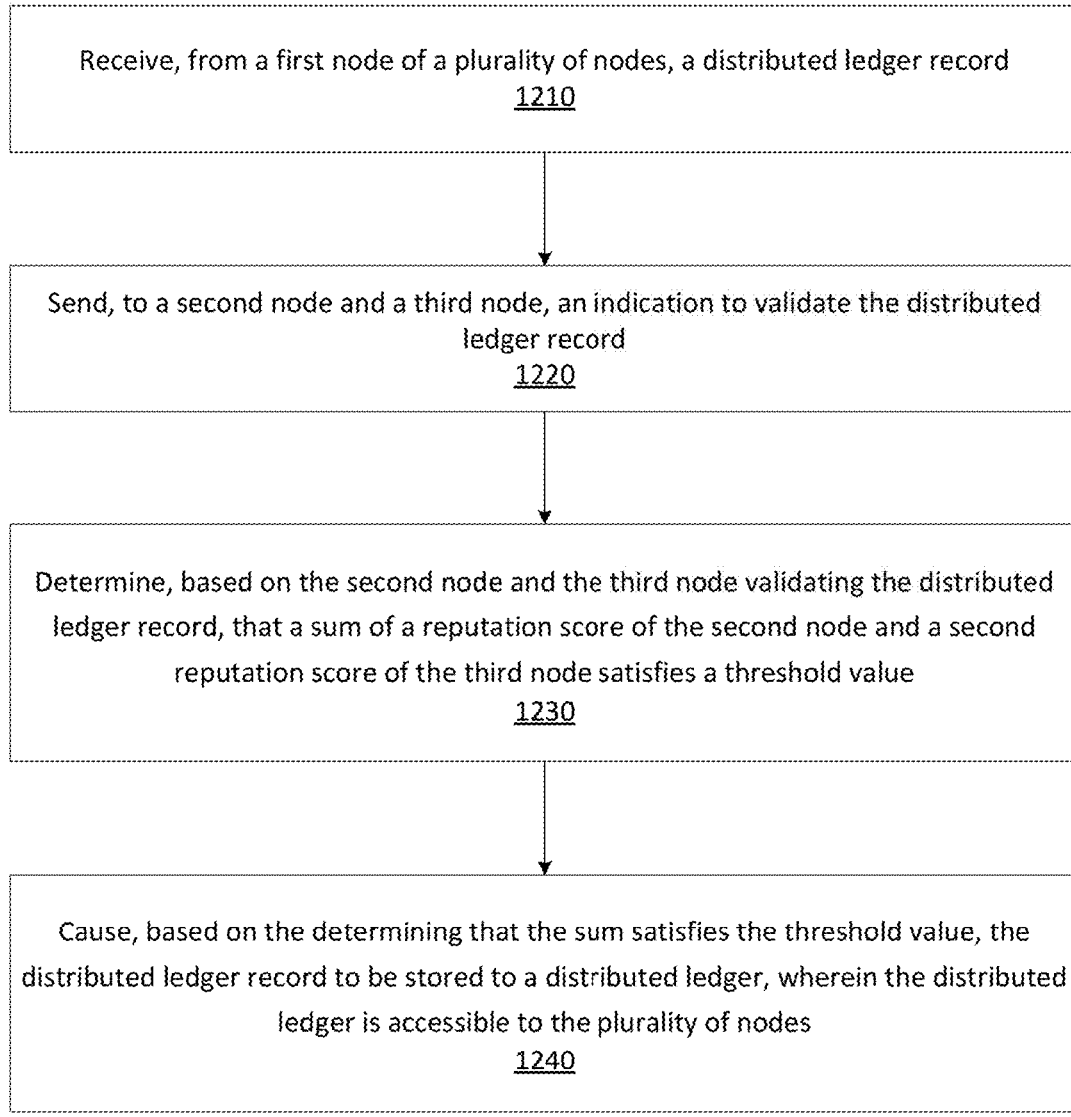
FIG. 12 shows an example method.

FIG. 12 shows an example method. At step 1210, a distributed ledger record may be received from a first node of a plurality of nodes. The participant node 602a in FIG. 6 may receive a distributed ledger record from a first node of a plurality of nodes. The first node may be associated with a content provider. The distributed ledger record may comprise an indication of a user of a service of the content provider. The indication of the user may comprise a function of a hash of personal identifying information of the user. The plurality of nodes may be each associated with at least one of a content provider, a content creator, a retailer, or a service provider. The distributed ledger record may comprise an indication that a response was provided by a first service provider to a query from a second service provider. The query may be associated with behavior of a user. The distributed ledger record may comprise an indication that the response was stored to a distributed database of user data. The distributed ledger record may comprise an indication of the source of the query and/or the source of the response to the query. The distributed ledger record may be sent to the first node. The participant node 602a in FIG. 6 may send the distributed ledger record to the first node.

At step 1220, an indication to validate the distributed ledger record may be sent to a second node and a third node. The participant node 602a in FIG. 6 may send an indication to validate the distributed ledger record to a second node and a third node. The sending the indication to validate the distributed ledger record may be based on randomly selecting the second node and the third node. The distributed ledger record may comprise an indication that a response to a query was received from a fourth node of the plurality of nodes.

At step 1230, a determination may be made that a sum of a reputation score of the second node and a second reputation score of the third node satisfies a threshold value based on the second node and the third node validating the distributed ledger record. The participant node 602a in FIG. 6 may determine that a sum of a reputation score of the second node and a second reputation score of the third node satisfies a threshold value based on the second node and the third node validating the distributed ledger record.

The sending the indication to validate the distributed ledger record may be based on determining that the sum satisfies a minimum validation value. The determining that the sum satisfies the threshold value may comprise determining that the sum meets or exceeds the threshold value. The threshold value may comprise a minimum value required for validation of the distributed ledger record. The reputation score may be based on a frequency of generation of distributed ledger records by the second node. The reputation score may be based on a level of technical maintenance of the second node. The sending the distributed ledger record to the first node may be based on determining that a reputation score of the first node satisfies the threshold value. The threshold value may comprise a minimum value required for validation of the distributed ledger record.

At step 1240, the distributed ledger record may be caused to be stored to a distributed ledger based on the determining that the sum satisfies the threshold value. The participant node 602a in FIG. 6 may cause the distributed ledger record to be stored to a distributed ledger based on the determining that the sum satisfies the threshold value. The distributed ledger may be accessible to the plurality of nodes. The reputation score may be based on an amount of data generated by the second node stored to the distributed ledger. The reputation score may be based on payments of fees associated with the distributed ledger by a user of the second node.

The distributed ledger may comprise a plurality of distributed ledger records comprising indications of information shared by the plurality of nodes. The distributed ledger may comprise a blockchain and the distributed ledger record may comprise a blockchain transaction. The distributed ledger may be accessible to the plurality of nodes.

The first node may be configured to validate the distributed ledger record based on a determination that the distributed ledger record comprises data that is consistent with data stored to the distributed ledger. The first node may be configured to validate the distributed ledger record based on a determination that the distributed ledger record comprises data that does not contradict data stored to the distributed ledger. The first node may be configured to validate the distributed ledger record based on a determination that the distributed ledger record comprises data that has not been stored to the distributed ledger.

The causing the distributed ledger record to be stored to the distributed ledger may be based on a fourth node validating the distributed ledger record. The causing the distributed ledger record to be stored to the distributed ledger may be based on a determination that the distributed ledger record comprises data that has not been stored to the distributed ledger.

The distributed ledger record may be sent to a fourth node. The participant node 602a in FIG. 6 may send the distributed ledger record to a fourth node. The causing the distributed ledger record to be stored to the distributed ledger may be based on the fourth node validating the distributed ledger record. The causing the distributed ledger record to be stored to the distributed ledger may be based on a sum of the reputation score of the second node, the second reputation score of the third node, and a third reputation score of the fourth node satisfying the threshold value. A bill may be sent to a user associated with the second node based on the distributed ledger record being stored to the distributed ledger. The participant node 602a in FIG. 6 may send a bill to a user associated with the second node based on the distributed ledger record being stored to the distributed ledger. Payment and/or compensation may be sent to a party that provided data and/or a response to the second node based on the distributed ledger record being stored to the distributed ledger.

A first entity associated with a first participant node may make timely payments to a platform, frequently submit information to the platform, and maintain the first participant node with no technical problems. The first participant node associated with the first entity may comprise a high reputation score. A second entity associated with a second participant node may fail to make timely payments to the platform, infrequently submit information to the platform, and fail to maintain the second participant node with no technical problems. The second participant node associated with the second entity may comprise a low reputation score. A plurality of participant nodes may elect the first participant node and the second participant node as validators based on a proof of reputation staking protocol and a sum of the high reputation score and the low reputation score exceeding a threshold. A third participant node may submit a query as a transaction in a mempool associated with the platform. One or more of the participant nodes elected as the validators may retrieve the transaction from the mempool and create a block comprising the transaction in a blockchain associated with the platform.

For example, a blockchain node may receive a blockchain transaction from a computing device associated with a digital content provider. The transaction may comprise an indication that data associated with digital content accessed by a user was provided. The node may send the transaction to a computing device associated with an advertising agency, a computing device associated with a content creator, and a computing device associated with a content distributor. The node may send the computing devices an indication to vote to validate the transaction.

The node may receive a vote to validate the transaction from the content creator computing device and the content distributor computing device. The node may receive a vote to not validate the transaction from the advertising agency computing device. The node may add a reputation score of the content creator computing device and the content distributor computing device. The sum of the reputation scores may satisfy a threshold value. Based on the sum satisfying the threshold value, the node may add the transaction to a blockchain.

Figure 13:
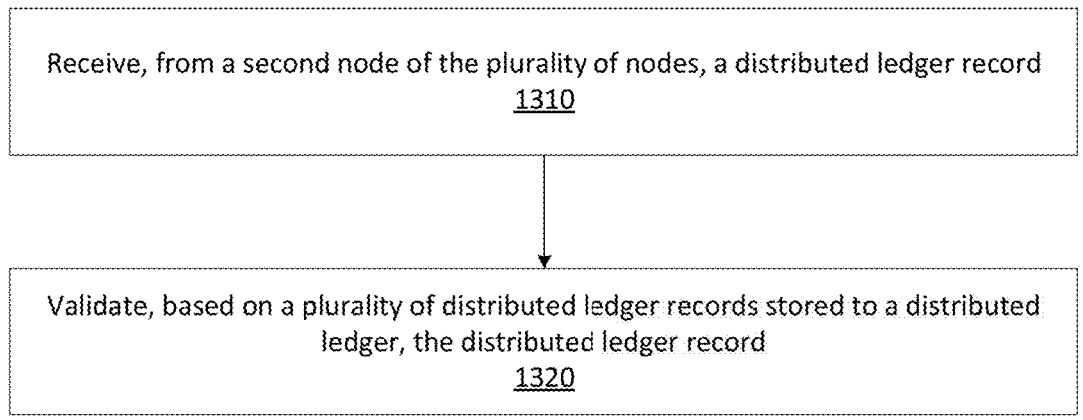
FIG. 13 shows an example method.

FIG. 13 shows an example method. At step 1310, a distributed ledger record may be received by a first node of a plurality of nodes from a second node of the plurality of nodes. One of the peer participant nodes 602n in FIG. 6 may receive a distributed ledger record from another of the peer participant nodes 602n in FIG. 6. The second node may be associated with a content provider. The distributed ledger record may comprise an indication of a user of a service of the content provider. The indication of the user may comprise a function of a hash of personal identifying information of the user. The plurality of nodes may be each associated with at least one of a content provider, a content creator, a retailer, or a service provider. The distributed ledger record may comprise an indication that a response was received from a first service provider. The response may comprise a response to a query from a second service provider. The query may be associated with behavior of a user. The distributed ledger record may comprise an indication of the first service provider and/or the second service provider.

At step 1320, the distributed ledger record may be validated based on a plurality of distributed ledger records stored to a distributed ledger. The one of the peer participant nodes 602n in FIG. 6 may validate the distributed ledger record based on a plurality of distributed ledger records stored to a distributed ledger. The distributed ledger may comprise the plurality of distributed ledger records comprising indications of information shared by the plurality of nodes. The distributed ledger may comprise a blockchain and the distributed ledger record may comprise a blockchain transaction. The distributed ledger may be accessible to the plurality of nodes.

The first node may be configured to validate the distributed ledger record based on a determination that the distributed ledger record comprises data that is consistent with data stored to the distributed ledger. The first node may be configured to validate the distributed ledger record based on a determination that the distributed ledger record comprises data that does not contradict data stored to the distributed ledger. The first node may be configured to validate the distributed ledger record based on a determination that the distributed ledger record comprises data that has not been stored to the distributed ledger.

For example, a computing device associated with a content creator may receive a distributed ledger record. The distributed ledger record may comprise data associated with viewing patterns of a user. The distributed ledger record may comprise an encrypted identifier of the user. The distributed ledger record may comprise an indication of the source of a query associated with the user and/or the source of a response to the query.

The computing device may search a distributed ledger, such as using an identifier of the user, a source of a query associated with the user, and/or a source of a response to the query. The computing device may determine one or more records stored to the distributed ledger comprising the identifier. The computing device may determine that the records stored to the distributed ledger do not comprise data that conflicts with the data of the received record. Based on the determination that the data does not conflict, the computing device may determine to vote to validate the received distributed ledger record.

The computing device may determine that a record stored to the distributed ledger record comprises data that conflicts with the data of the received record. Based on the determination that the data conflicts, the computing device may determine to vote against validating the received distributed ledger record. The computing device may send an indication of the vote to validate or to not validate the distributed ledger record to a device configured to add records to the distributed ledger.

Figure 14:
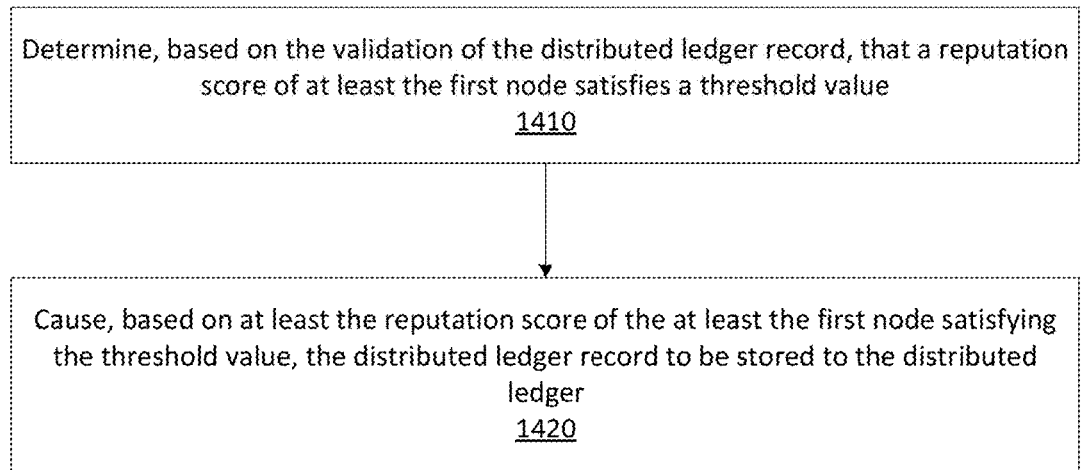
FIG. 14 shows an example method.

FIG. 14 shows an example method. At step 1410, a determination may be made by a third node of the plurality of nodes that a reputation score of at least the first node satisfies a threshold value based on the validation of the distributed ledger record. The participant node 602a in FIG. 6 may determine that a reputation score of at least the one of the peer participant nodes 602n in FIG. 6 satisfies a threshold value based on the validation of the distributed ledger record. The reputation score may be based on a frequency of generation of distributed ledger records by the first node. The reputation score may be based on an amount of data generated by the first node stored to the distributed ledger. The reputation score may be based on payments of fees associated with the distributed ledger by a user of the first node. The reputation score may be based on a level of technical maintenance of the first node.

The distributed ledger record may comprise an indication that a response to a query was received from a fourth node of the plurality of nodes. The distributed ledger record may comprise an indication of the fourth node. The distributed ledger record may comprise an indication of the fourth node. The third node may be configured to send the distributed ledger record to the first node. The sending the distributed ledger record to the first node may be based on determining that the reputation score of the first node satisfies the threshold value. The threshold value may comprise a minimum value required for validation of the distributed ledger record.

At step 1420, the distributed ledger record may be caused to be stored to the distributed ledger based on at least the reputation score of the at least the first node satisfying the threshold value. The participant node 602a in FIG. 6 may cause the distributed ledger record to be stored to the distributed ledger based on at least the reputation score of the at least the one of the peer participant nodes 602n in FIG. 6 satisfying the threshold value.

The causing the distributed ledger record to be stored to the distributed ledger may be based on a sum of the reputation score of the first node and a reputation score of a fourth node validating the distributed ledger record. The causing the distributed ledger record to be stored to the distributed ledger may be based on the sum satisfying the threshold value. The threshold value may comprise a minimum value required for validation of the distributed ledger record. The sum satisfying the threshold value may comprise the sum meeting or exceeding the threshold value. The causing the distributed ledger record to be stored to the distributed ledger may be based on a fourth node validating the distributed ledger record. The causing the distributed ledger record to be stored to the distributed ledger may be based on a determination that the distributed ledger record comprises data that has not been stored to the distributed ledger.

The third node may be configured to send the distributed ledger record to a fourth node. The causing the distributed ledger record to be stored to the distributed ledger may be based on the fourth node validating the distributed ledger record. The causing the distributed ledger record to be stored to the distributed ledger may be based on a sum of the reputation score of the first node and a reputation score of the fourth node satisfying the threshold value. The third node may be configured to send a bill to a user associated with the second node based on the distributed ledger record being stored to the distributed ledger. The third node may be configured to send payment to a party that provided data to the second node.

An entity associated with a first participant node may make timely payments to a platform, frequently submit information to the platform, and maintain the first participant node with no technical problems. The first participant node associated with the entity may comprise a high reputation score. A plurality of participant nodes may elect the first participant node as a validator based on a proof of reputation staking protocol and the high reputation score. A second participant node may submit a response to a query as a transaction in a mempool associated with the platform. The participant node elected as the validator may mint a block on a blockchain associated with the platform, wherein the minted block comprises the transaction in the mempool.

For example, an administrator of a distributed ledger may receive a vote to validate or not to validate a distributed ledger record from three computing devices. The administrator may receive a vote not to validate the record from a first computing device and a second computing device. The administrator may receive a vote to validate the record from a third computing device. The first computing device may have a reputation score of 3. The second computing device may have a reputation score of 6. The third computing device may have a reputation score of 9. Validation of the record may require votes from one or more computing devices having a cumulative reputation score of 9 or greater. Based on the third computing device voting to validate the record and the third computing device having a reputation score of 9, the administrator may determine that the record is validated. Based on the validation of the record, the administrator may add the record to a distributed ledger.

Figure 15:
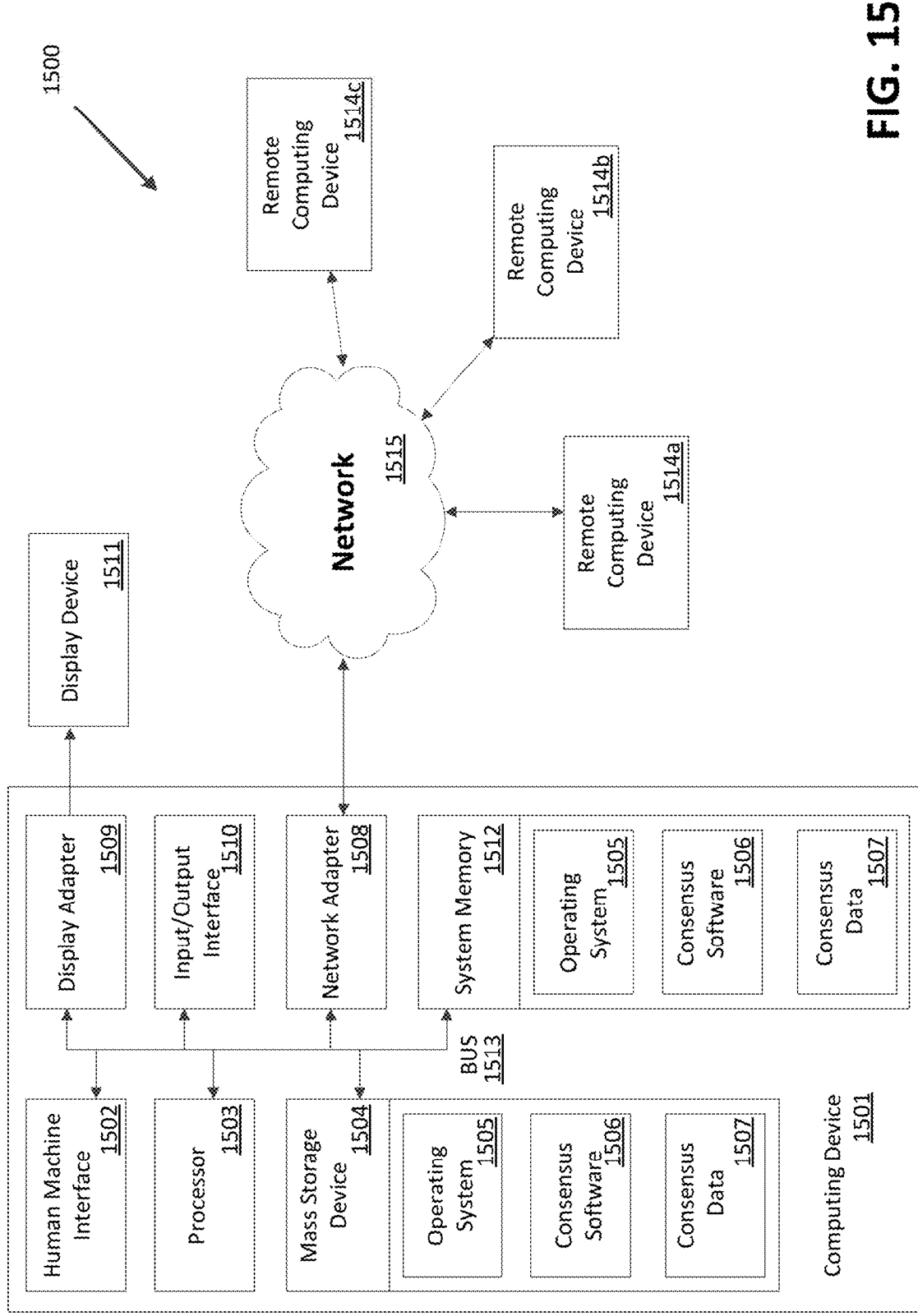
FIG. 15 shows an example computing environment.

The systems, methods, and apparatuses described herein may be implemented on a computing device such as a computing device 1501 (e.g., computer) as shown in FIG. 15 and described below. The one or more nodes 110 in FIG. 1 may be and/or comprise a computing device as shown in FIG. 15. The participant node 602*a* and peer participant nodes 602*n* in FIG. 6 may be and/or comprise a computing device as shown in FIG. 15. Similarly, the methods, systems, and apparatuses disclosed may utilize one or more computing device to perform one or more functions in one or more locations. FIG. 15 is a block diagram showing an operating environment for performing the disclosed methods, systems, and apparatuses. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 1501. The components of the computing device 1501 may comprise, but are not limited to, one or more processors 1503, a system memory 1512, and a system bus 1513 that couples various system components including the processor 1503 to the system memory 1512. With multiple processors 1503, the system may utilize parallel computing.

The system bus 1513 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1513, and all buses specified in this description may be implemented over a wired or wireless network connection and each of the subsystems, including the processor 1503, a mass storage device 1504, an operating system 1505, reputation-based consensus protocol software 1506, reputation-based consensus protocol data 1507, a network adapter 1508, system memory 1512, an Input/Output Interface 1510, a display adapter 1509, a display device 1511, and a human machine interface 1502, may be contained within one or more remote computing devices 1514a, b, c at physically separate locations, connected through buses of this form, in effect implementing a fully distributed system.

The computing device 1501 typically comprises a variety of computer readable media. Readable media may be any available media that is accessible by the computing device 1501 and comprises both volatile and non-volatile media, removable and non-removable media. The system memory 1512 comprises computer readable media in the form of volatile memory, such as random access memory (RAM), and/or non-volatile memory, such as read only memory (ROM). The system memory 1512 typically contains data such as reputation-based consensus protocol data 1507 and/or program modules such as operating system 1505 and reputation-based consensus protocol software 1506 that are immediately accessible to and/or are presently operated on by the processor 1503.

The computing device 1501 may comprise other removable/non-removable, volatile/non-volatile computer storage media. FIG. 15 shows a mass storage device 1504 which may provide non-volatile storage of computer code, computer readable instructions, data structures, program modules, and other data for the computing device 1501. A mass storage device 1504 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1504, including an operating system 1505 and reputation-based consensus protocol software 1506. Each of the operating system 1505 and reputation-based consensus protocol software 1506 (or some combination thereof) may comprise elements of the programming and the reputation-based consensus protocol software 1506. Reputation-based consensus protocol data 1507 may be stored on the mass storage device 1504. Reputation-based consensus protocol data 1507 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 1501 via an input device (not shown). Input devices may comprise, but are not limited to, a keyboard, pointing device (e.g., a "mouse"), a microphone, and a joystick, tactile input devices such as gloves, and other body coverings, and the like. These and other input devices may be connected to the processor 1503 via a human machine interface 1502 that is coupled to the system bus 1513, but may be connected by other interface and bus structures, such as a parallel port, game port, an IEEE 1394 Port (also known as a Firewire port), a serial port, or a universal serial bus (USB).

A display device 1511 may be connected to the system bus 1513 via an interface, such as a display adapter 1509. It is contemplated that the computing device 1501 may have more than one display adapter 1509 and the computing device 1501 may have more than one display device 1511. A display device may be a monitor, an LCD (Liquid Crystal Display), or a projector. Output peripheral devices may comprise components such as speakers (not shown) and a printer (not shown) which may be connected to the computing device 1501 via Input/Output Interface 1510. Any step and/or result of the methods may be output in any form to an output device. Such output may be any form of visual representation, including, but not limited to, textual, graphical, animation, audio, tactile, and the like. The display 1511 and computing device 1501 may be part of one device, or separate devices.

The computing device 1501 may operate in a networked environment using logical connections to one or more remote computing devices 1514a, b, c. A remote computing device may be a personal computer, portable computer, smartphone, a server, a router, a network computer, a peer device or other common network node, and so on. Logical connections between the computing device 1501 and a remote computing device 1514a, b, c may be made via a network 1515, such as a local area network (LAN) and a general wide area network (WAN). Such network connections may be through a network adapter 1508. A network adapter 1508 may be implemented in both wired and wireless environments. Such networking environments are conventional and commonplace in dwellings, offices, enterprise-wide computer networks, intranets, and the Internet.

Application programs and other executable program components such as the operating system 1505 are shown herein as discrete blocks, although it is recognized that such programs and components reside at various times in different storage components of the computing device 1501, and are executed by the data processor(s) of the computer. An implementation of reputation-based consensus protocol software 1506 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. A method comprising:
receiving, from a first computing node of a plurality of computing nodes comprising at least one hardware component, a distributed ledger record;
determining a first reputation score associated with a second computing node and a second reputation score associated with a third computing node;
determining the first reputation score of the second computing node exceeds a threshold reputation score and the second reputation score of the third computing node does not exceed a threshold reputation score;
sending, to the second computing node, based on the first reputation score associated with the second computing node exceeding the threshold reputation score, an indication to validate the distributed ledger record; and causing, based on the sending the indication to validate the distributed ledger record to the second computing node, the distributed ledger record to be stored to a distributed ledger, wherein the distributed ledger is accessible to the plurality of computing nodes.

2. The method of claim 1, wherein the first reputation score is based on at least one of an amount of data received from the second computing node, a frequency of data received from the second computing node, payments of fees by a user associated with the second computing node, or a level of technical maintenance of the second computing node.

3. The method of claim 1, wherein the sending the indication to validate the distributed ledger record is based on randomly selecting the second computing node and the third computing node.

4. The method of claim 1, wherein the sending the indication to validate the distributed ledger record is based on determining that the first reputation score satisfies a minimum validation value and the second reputation score does not satisfy the minimum validation value.

5. The method of claim 1, wherein the distributed ledger record comprises a source of a query and a source of a response to the query.

6. The method of claim 5, comprising determining a bill for the source of the query and compensation for the source of the response.

7. The method of claim 1, further comprising;
determining, based on the determining the second reputation does not exceed the threshold reputation score, an additional computing node of the plurality of computing nodes with a third reputation score, wherein the third reputation score exceeds the threshold reputation score; and
sending, to the additional computing node, based on the third reputation score associated with the additional computing node exceeding the threshold reputation score, the indication to validate the distributed ledger record.

8. A method comprising:
receiving, from a first computing node of a plurality of computing nodes comprising at least one hardware component, a distributed ledger record;
sending, to a second computing node and a third computing node, an indication to validate the distributed ledger record;
determining, based on the second computing node and the third computing node validating the distributed ledger record, the distributed ledger record associated with the first computing node, that a reputation score of the first computing node satisfies a threshold value; and
causing, based on the determining that the reputation score satisfies the threshold value, the distributed ledger record to be stored to a distributed ledger, wherein the distributed ledger is accessible to the plurality of computing nodes.

9. The method of claim 8, wherein the reputation score is based on at least one of an amount of data received from the first computing node, a frequency of data received from the first computing node, payments of fees by a user associated with the first computing node, or a level of technical maintenance of the first computing node.

10. The method of claim 8, wherein the sending the indication to validate the distributed ledger record is based on randomly selecting the second computing node and the third computing node.

11. The method of claim 8, wherein the sending the indication to validate the distributed ledger record is based on determining that the reputation score satisfies a minimum validation value.

12. The method of claim 8, wherein the distributed ledger record comprises a source of a query and a source of a response to the query.

13. The method of claim 12, comprising determining a bill for the source of the query and compensation for the source of the response.

14. A method comprising:
receiving, from a first computing node of a plurality of computing nodes comprising at least one hardware component, a distributed ledger record indicating a user identifier and an advertisement identifier;
sending, to a second computing node and a third computing node, an indication to validate the distributed ledger record;
determining, based on the second computing node and the third computing node validating the distributed ledger record, the distributed ledger record associated with the first computing node, that a sum of a first reputation score of the second computing node and a second reputation score of the third computing node satisfies a threshold value;
causing, based on the determining that the sum satisfies the threshold value, the distributed ledger record to be stored to a distributed ledger, wherein the distributed ledger is accessible to the plurality of computing nodes; and
receiving, from a fourth computing node of the plurality of computing nodes, a request for the distributed ledger record, wherein the fourth computing node is configured to send, based at least in part on the advertisement identifier, an advertisement to a user associated with the user identifier.

15. The method of claim 14, wherein the request is a first request, further comprising; receiving, from the fourth computing node of the plurality of computing nodes, a second request for a second distributed ledger record stored on the distributed ledger, wherein the second distributed ledger record is associated with at least the user identifier, and wherein the fourth computing node is further configured to send the advertisement to the user based at least in part on the first request and the second request.

16. The method of claim 14, wherein the first reputation score is based on at least one of an amount of data received from the second computing node, a frequency of data received from the second computing node, payments of fees by a user associated with the second computing node, or a level of technical maintenance of the second computing node.

17. The method of claim 14, wherein the sending the indication to validate the distributed ledger record is based on randomly selecting the second computing node and the third computing node.

18. The method of claim 14, wherein the sending the indication to validate the distributed ledger record is based on determining that the sum satisfies a minimum validation value.

19. The method of claim 14, wherein the distributed ledger record comprises a source of a query and a source of a response to the query.

20. The method of claim 19, comprising determining a bill for the source of the query and compensation for the source of the response.

* * * * *